(12) United States Patent  (10) Patent No.: US 7,835,085 B2
Yamazaki  (45) Date of Patent: Nov. 16, 2010

(54) LENS BARREL AND METHOD OF OPERATION OF LENS BARREL

(75) Inventor: Satoshi Yamazaki, Tokyo (JP)

(73) Assignee: Nikon Corporation, Tokyo (JP)

( * ) Notice: Subject to any disclaimer, the term of this patent is extended or adjusted under 35 U.S.C. 154(b) by 374 days.

(21) Appl. No.: 11/588,275

(22) Filed: Oct. 27, 2006

(65) Prior Publication Data

US 2007/0153403 A1 Jul. 5, 2007

(30) Foreign Application Priority Data

Dec. 12, 2005 (JP) ............................. 2005-357099

(51) Int. Cl.
*G02B 15/14* (2006.01)
(52) U.S. Cl. .................................................. 359/695
(58) Field of Classification Search ......... 359/819–824, 359/695
See application file for complete search history.

(56) References Cited

U.S. PATENT DOCUMENTS

| | | | |
|---|---|---|---|
| 5,777,802 A * | 7/1998 | Koiwai et al. ................ 359/700 |
| 5,805,354 A * | 9/1998 | Kanno ......................... 359/701 |
| 5,861,998 A * | 1/1999 | Nishimura ................... 359/694 |
| 6,025,964 A * | 2/2000 | Yamamoto ................... 359/824 |
| 6,381,076 B1 | 4/2002 | Kashiwaba |
| 2003/0179467 A1 | 9/2003 | Todani |
| 2004/0027476 A1 * | 2/2004 | Masuda ....................... 348/335 |

FOREIGN PATENT DOCUMENTS

| | | |
|---|---|---|
| GB | 2 372 111 A | 8/2002 |
| JP | A 7-333482 | 12/1995 |
| JP | B 3455581 | 7/2003 |

* cited by examiner

*Primary Examiner*—Scott J Sugarman
*Assistant Examiner*—Vipin M Patel
(74) *Attorney, Agent, or Firm*—Oliff & Berridge, PLC

(57) ABSTRACT

A lens barrel having a first moving barrel, second moving barrel, and a third moving barrel. The first moving barrel has first cam grooves configured corresponding to a focusing operation and holds an optical system used in a focusing operation. The second moving barrel has second cam grooves and is provided in relation to the first moving barrel. The third moving barrel has third cam grooves configured corresponding to a zoom operation and can move relative to a fixed barrel. The second cam grooves correct a position of said optical system corresponding to a drive operation of the third cam grooves.

21 Claims, 18 Drawing Sheets

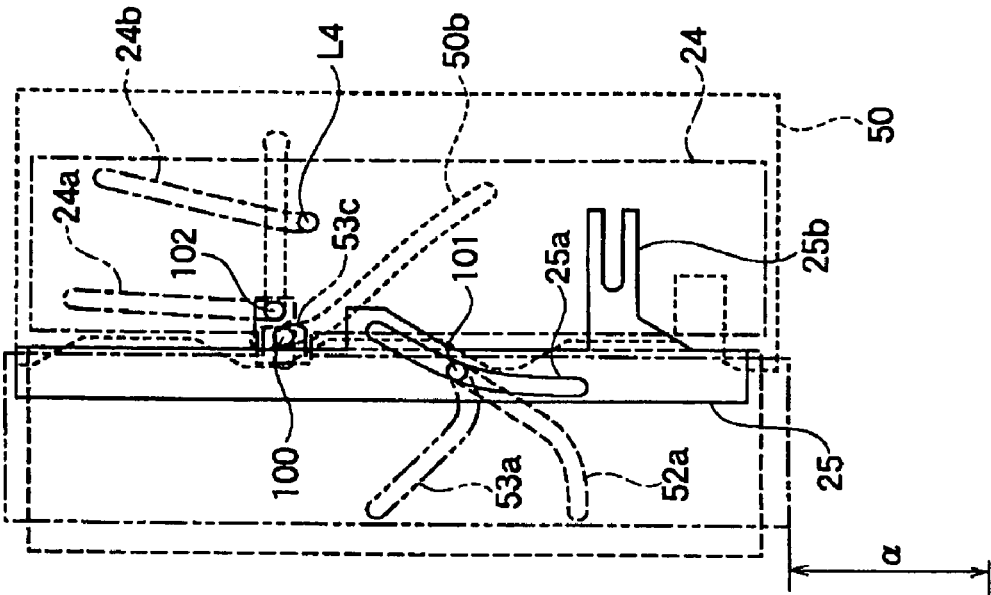
FIG. 16A Wide
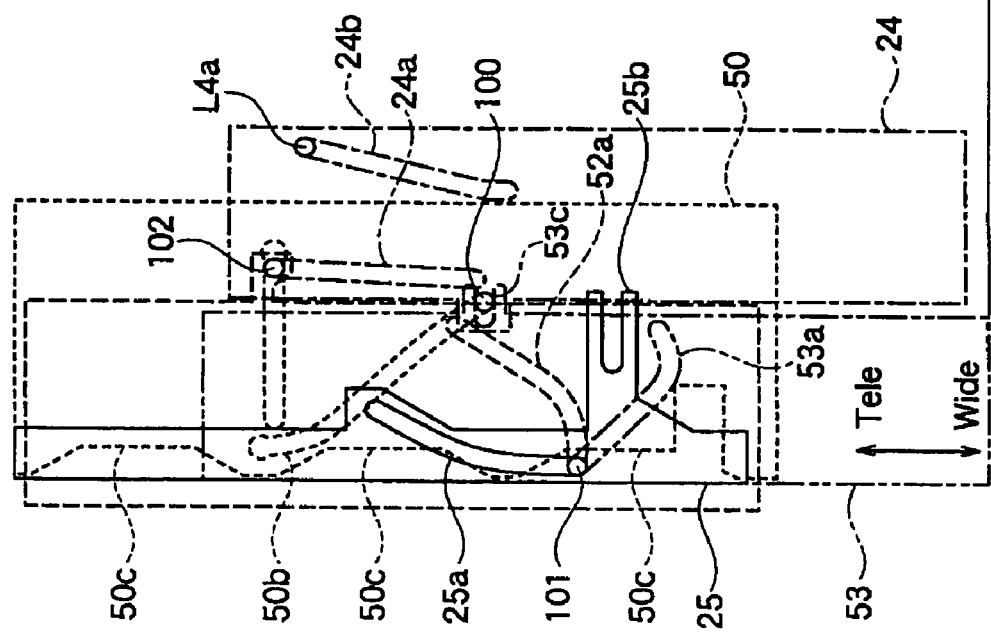
FIG. 16B Tele

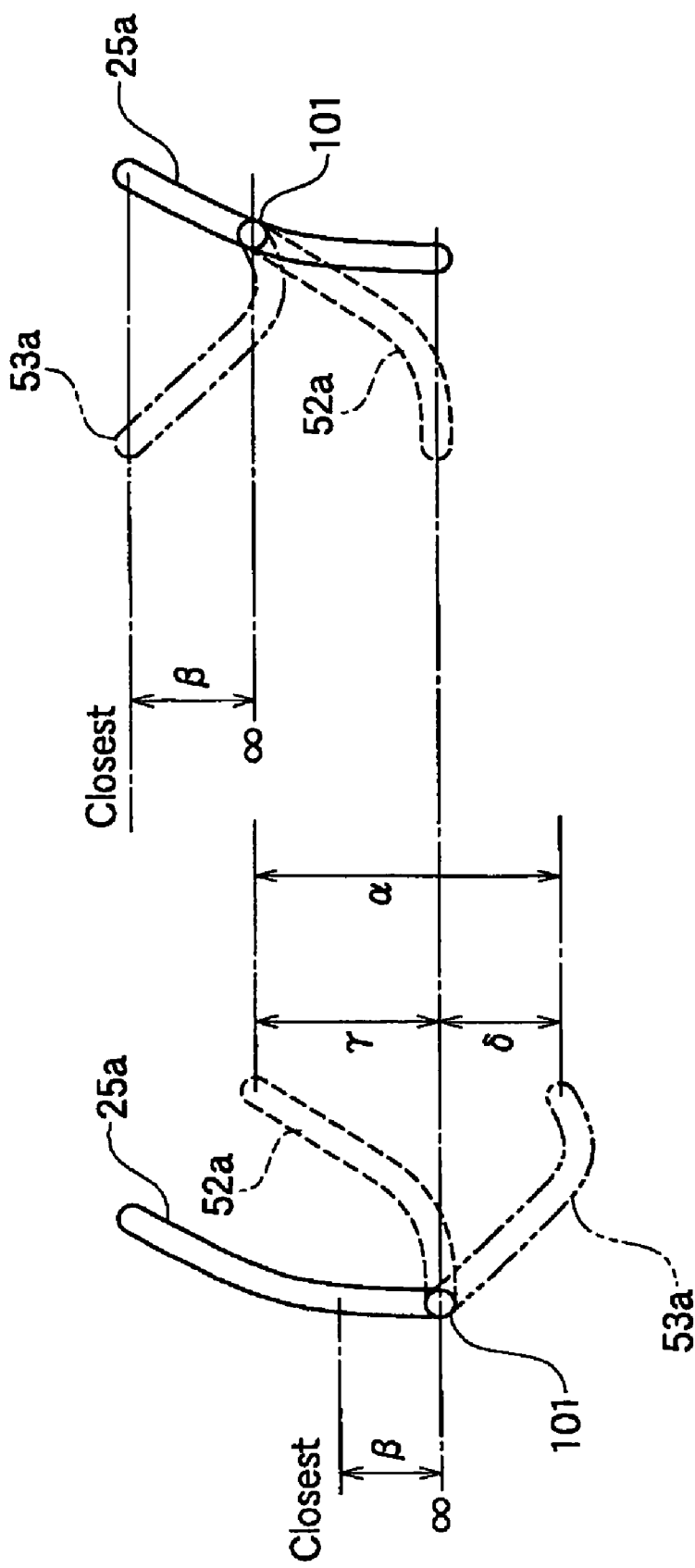
FIG. 17A Wide
FIG. 17B Tele

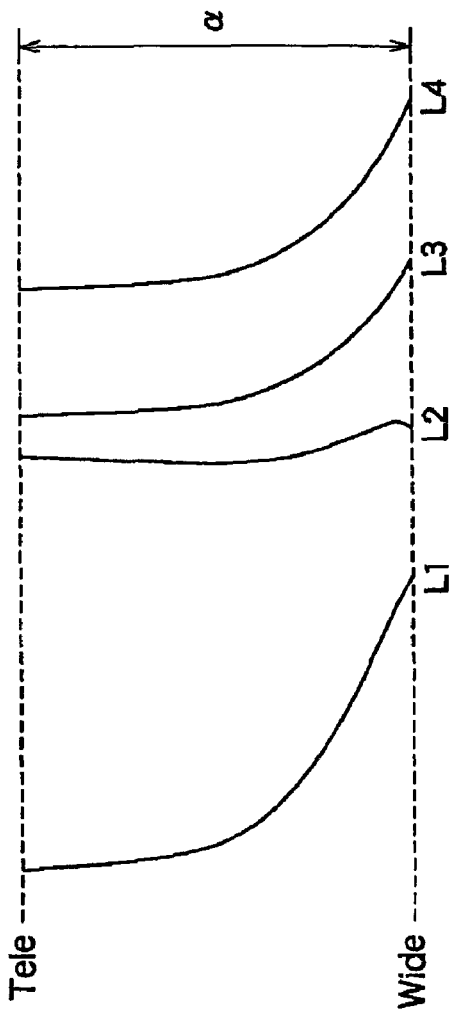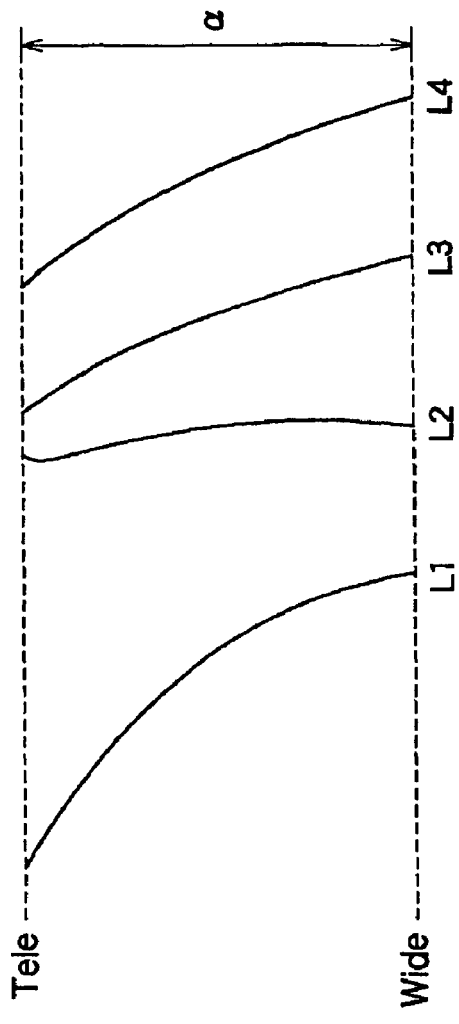
FIG. 18A
FIG. 18B

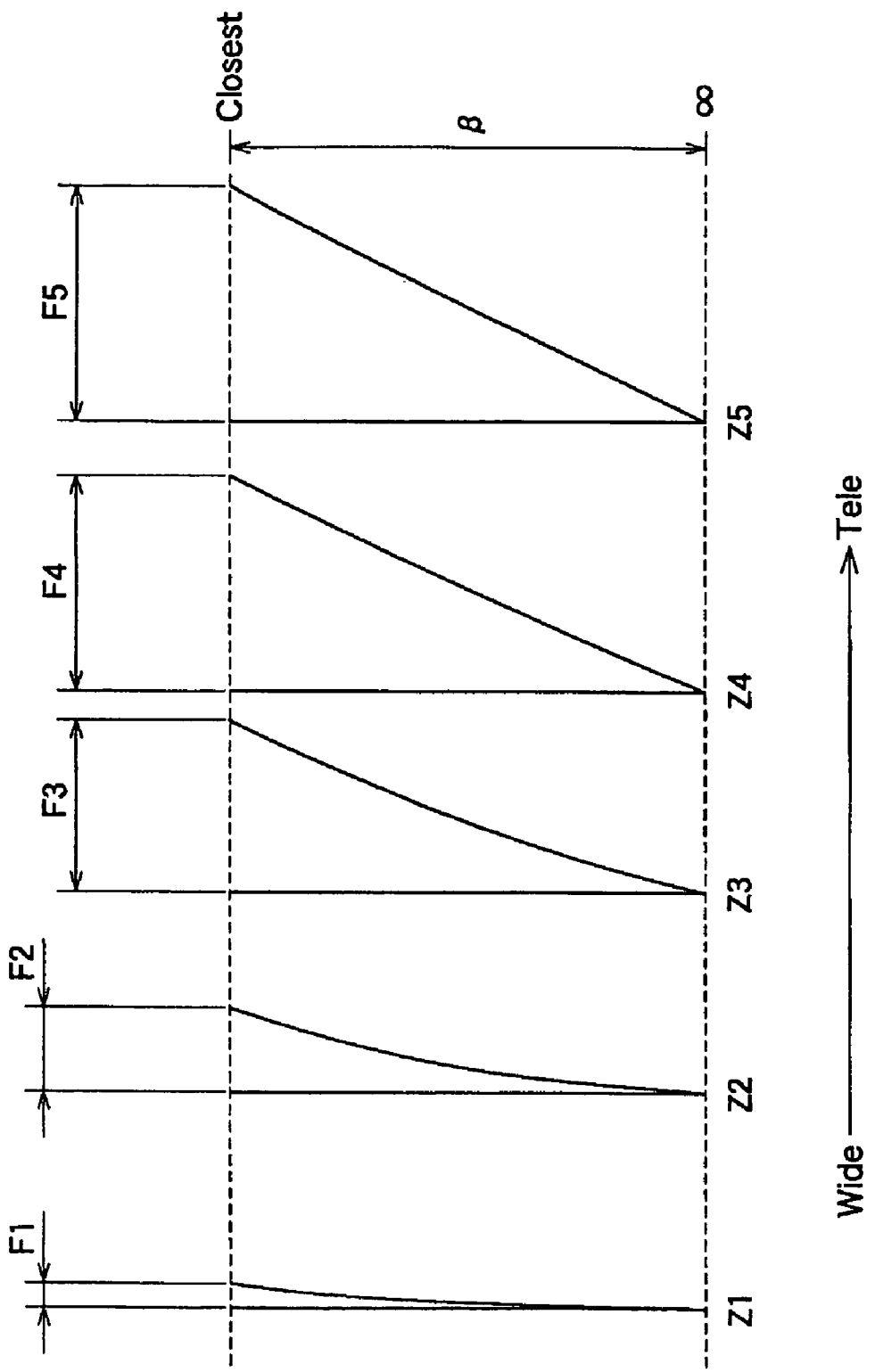

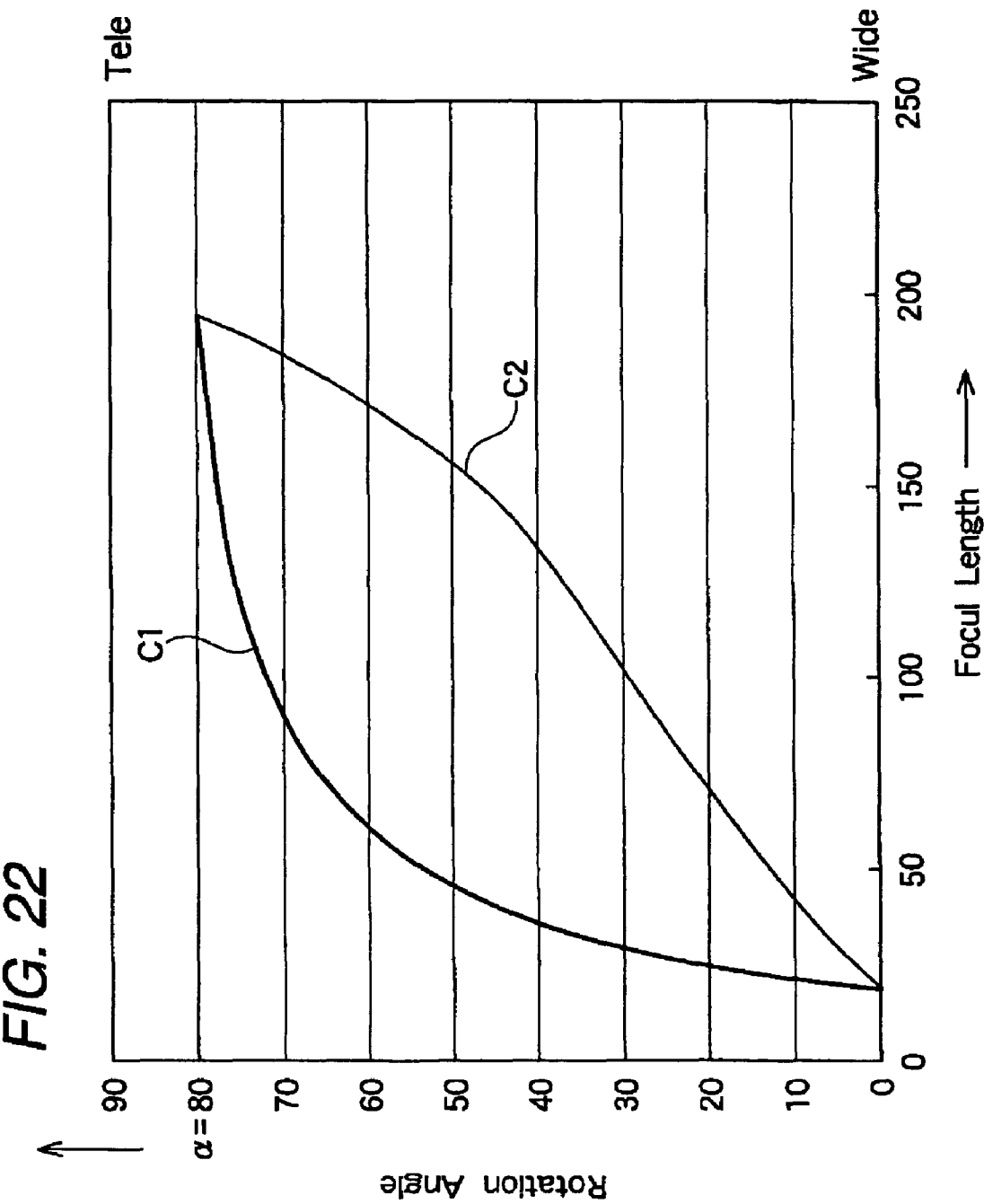

LENS BARREL AND METHOD OF OPERATION OF LENS BARREL

BACKGROUND OF THE INVENTION

1. Field of the Invention

The present invention relates to a lens barrel enabling a high power zoom operation and a method of operation of a lens barrel.

2. Description of the Related Art

As a prior art, a lens barrel employing an inner focus system and enabling a high power zoom operation is known. As prior art, for example Japanese Patent Publication (A) No. 7-333482 is known.

Conventional lens barrels, in particular lens barrels called "high powered" with zoom powers of over 10× as required for recent lens barrels, have the problems of too large movement of the lenses and the inability to be similarly configured.

Further, if giving priority to the design of the shapes of the focus cam grooves for correcting the amount of feed of the focusing lens accompanying a change in focal distance, the inclined faces of the cam grooves operating at the time of a zoom-operation will end up becoming too sharp and therefore a zoom drive operation utilizing cam grooves will no longer be able to be achieved.

SUMMARY OF THE INVENTION

An object of the present invention is to provide a lens barrel enabling a zoom operation and focus operation smooth even when high powered and a method of operation of a lens barrel.

To achieve the above object, a lens barrel according to a first aspect of the present invention includes a first moving barrel (25) having a first cam (25a) configured corresponding to a focusing operation and holding an optical system (L2) used in the focusing operation, a second moving barrel (52) having a second cam (52a) and provided in relation to the first moving barrel (25), and a third moving barrel (53) having a third cam (53a) configured corresponding to a zoom operation and able to move relative to a fixed barrel (50), wherein the second cam (52a) correct a position of the optical system (L2) in accordance with a drive operation of the third cam (53a).

Preferably, the barrel is further provided with a vibration reduction system eliminating effects of vibration of the lens barrel, positioned further to an image plane side from the optical system (L2).

Preferably, the zoom operation is performed by the combination of the second cam (52a) and the third cam (53a).

Preferably, at the time of a zoom operation, at least a part of the second cam (52a) is positioned further to an object side from the optical system (L2).

A lens barrel according to a second aspect of the present invention includes a first moving barrel (25) having a first cam (25a) and having an optical system (L2) used in the focusing operation, a second moving barrel (52) having a second cam (52a) and holding the first moving barrel (25), and a third moving barrel (53) having a third cam (53a) configured corresponding to a zoom operation and able to move relative to a fixed barrel (50), wherein the first moving barrel (25) is able to move relative to the second moving barrel (52) at the time of a focusing operation of the optical system, and the second cam grooves (52a), together with the third cam (53a), define a rotational angle of the third moving barrel (53).

Preferably, at the time of a zoom operation, at least a part of the second cam (52a) is positioned further to an object side from the optical system (L2).

A lens barrel according to a third aspect of the present invention characterized by including a first moving barrel (25) having an optical system (L2) used in a focusing operation and a second moving barrel (52) having a second cam (52a) able to move the first moving barrel (25) corresponding to a zoom operation and, at the time of a zoom operation, having at least parts of the second cam (52a) positioned further to an object side from the optical system (L2).

Preferably, the barrel further includes a third moving barrel (53) formed with a third cam (53a) working with the second cam grooves (52a) to determine an amount of a zoom operation at the time of a zoom operation.

A lens barrel according to a fourth aspect of the present invention includes a first moving barrel (25) holding an optical system (L2) used in a focusing operation, a second moving barrel (52) provided at an outside of the first moving barrel (25), and a third moving barrel (53) able to move relative to a fixed barrel (50) corresponding to a zoom operation, wherein the second moving barrel (25) is able to move corresponding to the third moving barrel (53), and the first moving barrel (25) is able to move relative to the second moving barrel (52) at the time of the focusing operation and is provided between the fixed barrel (50) and the third moving barrel (53).

Preferably, at the time of a zoom operation, at least a part of the second cam (52a) is positioned further to an object side from the optical system (L2).

A lens barrel according to a fifth aspect of the present invention including a first moving barrel (25) holding an optical system (L2) used in a focusing operation and a second moving barrel (52) having a cam (52a) and able to move in an axial direction of a fixed barrel (50) corresponding to a zoom operation, wherein the first moving barrel (25) can move, independent of the fixed barrel (50), relative to the second moving barrel (52), and the cam (52a) can move the first moving barrel (25) corresponding to a zoom operation.

Preferably, at the time of a zoom operation, at least a part of the cam (52a) is positioned further to an object side from the optical system (L2)

A lens barrel according to a sixth aspect of the present invention including a first moving barrel (25) having a first cam (25a) and holding an optical system (L2) used for a focusing operation, a second moving barrel (52) having a second cam (52a), and cam pins (101) engaging with the first cam (25a) and second cam (52a) and moving to predetermined positions along the second cam (52a) corresponding to a zoom operation, wherein the first moving barrel (25) rotates relative to the cam pins (101) along the first cam (25a) at the time of the focusing operation so as to move relative to the second moving barrel (52).

Preferably, at the time of a zoom operation, at least a part of the second cam (52a) is positioned further to an object side from the optical system (L2).

A method of operation of a lens barrel according to the first aspect of the present invention is characterized by using a first cam (25a) formed at a first moving barrel (25) holding an optical system (L2) used for a focusing operation to move the optical system (L2) and using a second cam (52a) provided at a second moving barrel (52) provided in relation to the first moving barrel (25) and a third cam (53a) provided at a third moving barrel (53) able to move relative to a fixed barrel (50) to determine a position of the optical system (L2) at the time of a zoom operation.

Preferably, the method further comprises eliminating an effect of vibration of the lens barrel further at an image plane side from the optical system (L2).

Preferably, the method further comprises using the second cam (52a) and the third cam (53a) in combination for the zoom operation.

Preferably, the method further comprises positioning at least parts of the second cam (52a) at the time of a zoom operation further at an object side from the optical system (L2).

A method of operation of a lens barrel according to a second aspect of the present invention comprises holding an optical system (L2) used for a focusing operation at a first moving barrel (25), moving a second moving barrel (52) relative to the first moving barrel (25) so that the second moving barrel (52) is at the outside of the first moving barrel (25), moving a third moving barrel (53) relative to a fixed barrel (50) corresponding to a zoom operation and moving the second moving barrel (52) corresponding to movement of the third moving barrel (53), and providing the first moving barrel (25) between the fixed barrel (50) and the third moving barrel (53).

Preferably, the method further comprises positioning at least a part of the second cam (52a) at the time of a zoom operation further to an object side from the optical system (L2).

Preferably, the method further comprises using the second cam (52a) and the third cam (53a) in combination for the zoom operation.

BRIEF DESCRIPTION OF THE DRAWINGS

Below, the present invention will be explained in detail based on the embodiments illustrated in the figures, wherein FIG. 16A is an unfolded view extracting the principal parts of FIG. 14, FIG. 16B is an unfolded view extracting the principal parts of FIG. 15, FIG. 17A is a schematic view extracting the three cam grooves and drive pins in FIG. 16A, FIG. 17B is a schematic view extracting the three cam grooves and drive pins in FIG. 16B, FIG. 18A is a view of the paths of movement of lens groups from a zoom wide angle ends (Wide) to a zoom telescopic end (Tele) found by optical design, FIG. 18B is a view of the paths of movement of lens groups from a zoom wide angle end (Wide) to a zoom telescopic end (Tele) due to the corrected cam groove shapes, FIG. 19 is a view of the amounts of movement of a focus lens frame at different zoom positions from a zoom wide angle end to a zoom telescopic end, FIG. 22 is a graph showing the relationship between the focal distance of a lens barrel and the rotational angle of a zoom operation ring according to the present embodiment.

DESCRIPTION OF THE PREFERRED EMBODIMENTS

Figure 1:
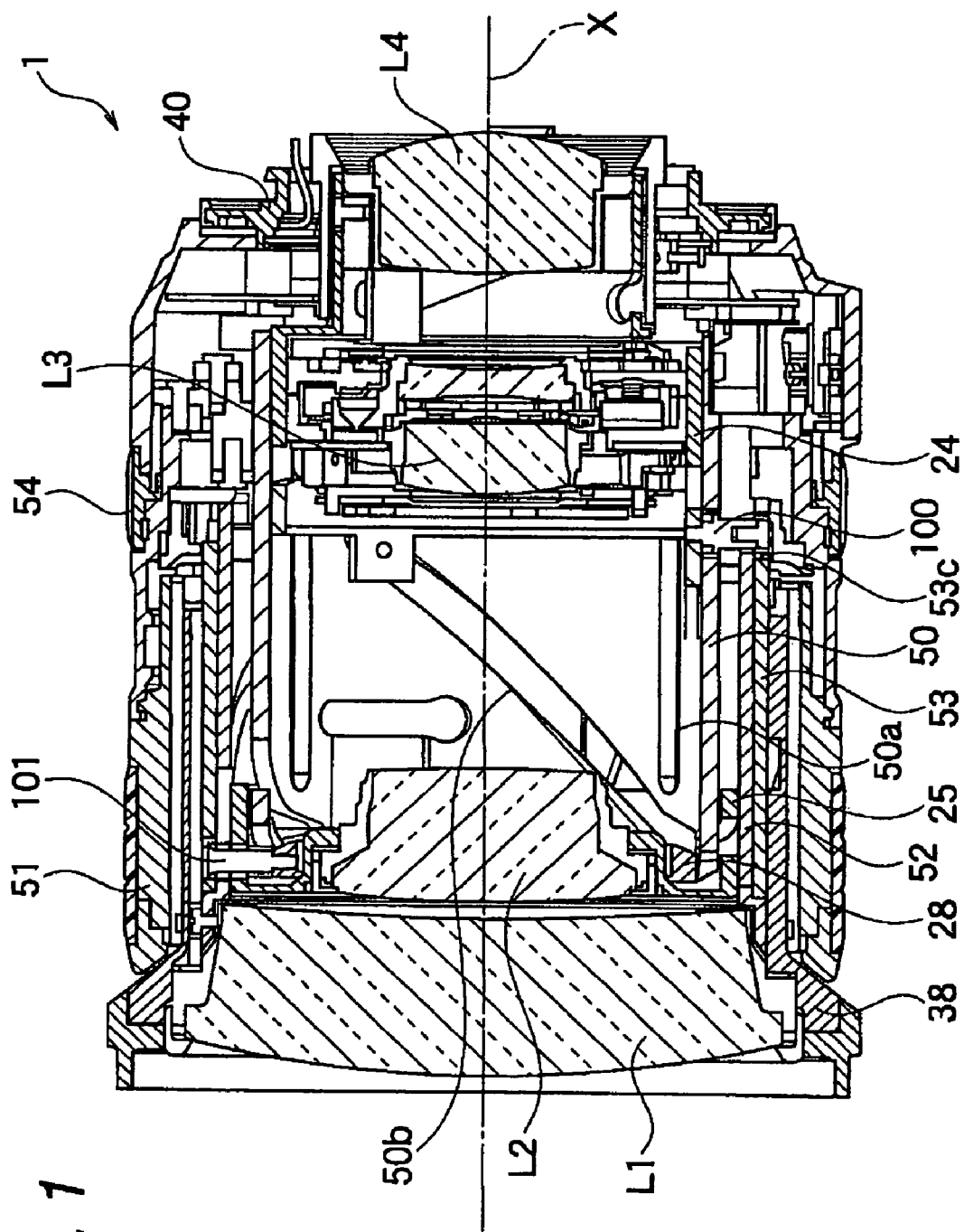
FIG. 1 is a vertical cross-sectional view showing a wide angle state of a lens barrel according to an embodiment of the present invention.
Figure 2:
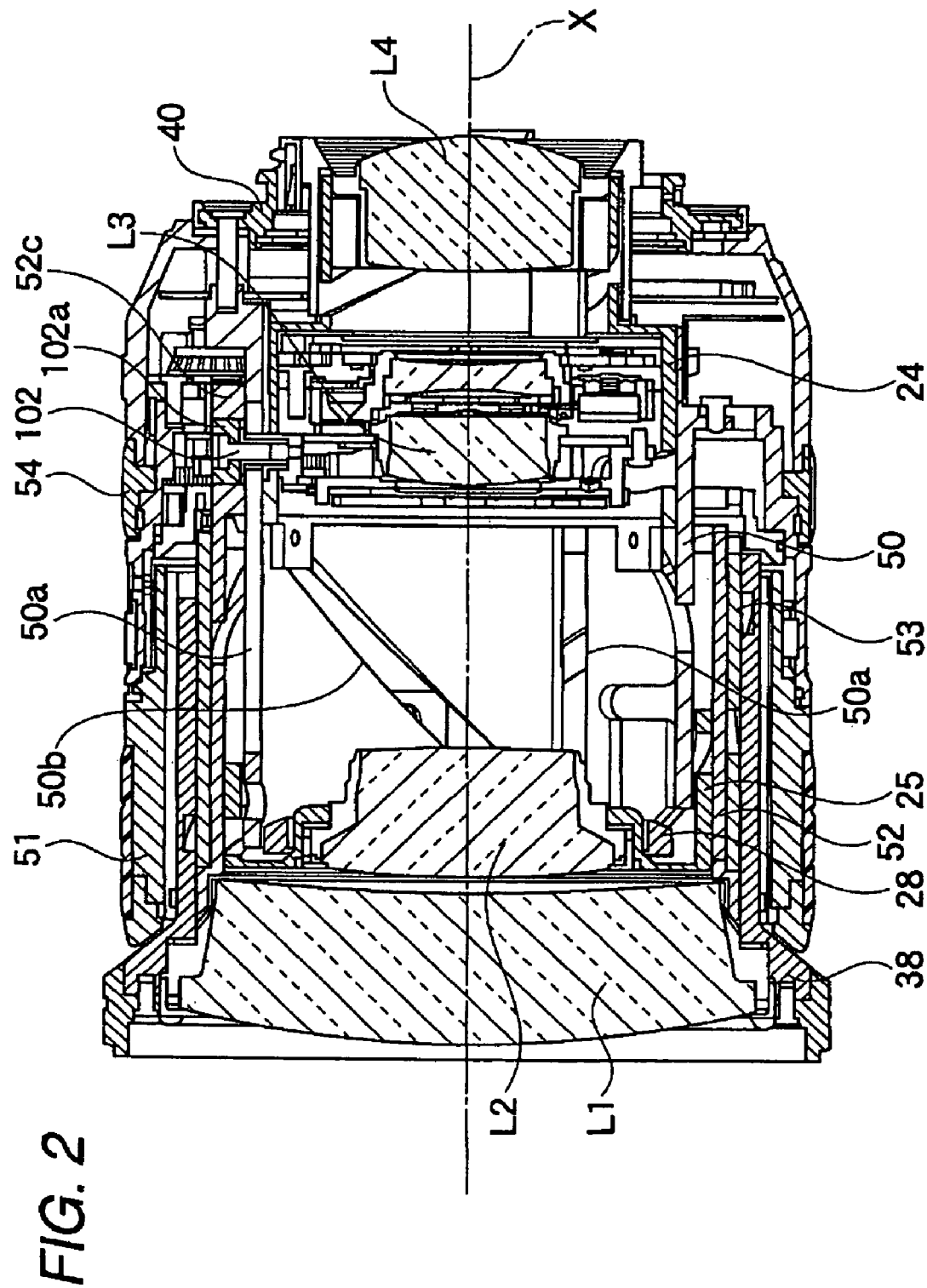
FIG. 2 is a vertical cross-sectional view showing a wide angle state of the lens barrel shown in FIG. 1 by a different vertical cross-section from FIG. 1.
Figure 3:
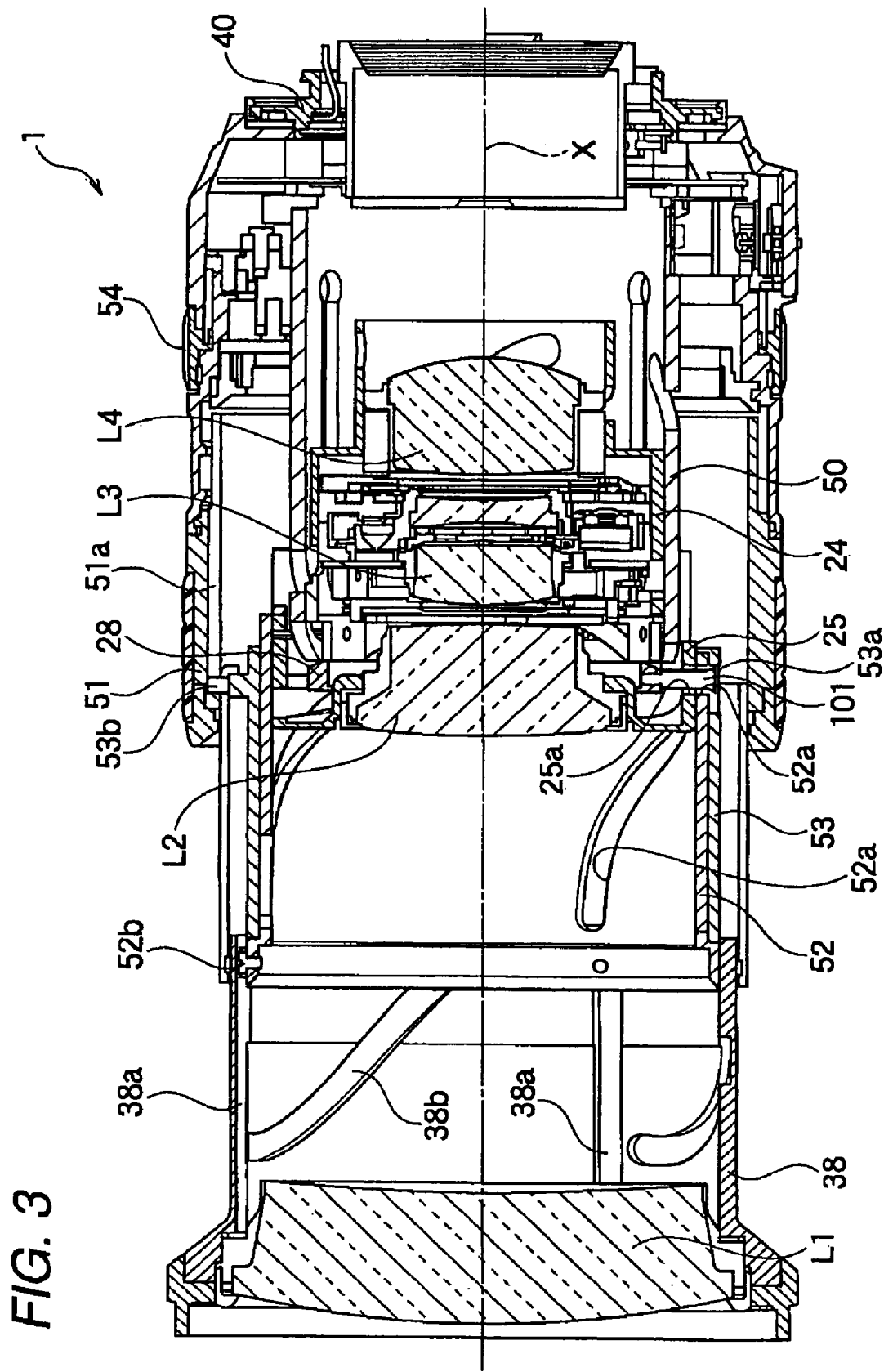
FIG. 3 is a cross-sectional view showing a telescopic state of the lens barrel shown in FIG. 1.

As shown in FIG. 1 to FIG. 3, the lens barrel 1 in the present embodiment is an exchangeable lens unit having an imaging optical system formed by four lens groups comprised of a first lens group L1, second lens group L2, third lens group L3, and fourth lens group L4 and operating to continuously change the focal distance (zoom operation).

The first lens group L1 to fourth lens group L4 all engage in independent advancing motion in the optical axis direction due to a zoom operation. The lens barrel 1 in the present embodiment is a lens barrel of the so-called inner focus system. At the time of a focus operation, only the second lens group L2 advances in the optical axis direction. The second lens group L2 corresponds to the focus lens.

The image capturing optical system of the present embodiment is a lens system changing in the necessary amount of feed of the second lens group L2 at the time of a focus operation in accordance with the zoom position of the imaging optical system (focal distance). The second lens group L2 is fixed to a focus lens frame 25 shown in FIG. 9. This lens frame 25 is formed with focus cam grooves (also called "focus cams") 25a.

The focus cam grooves 25a correct the required amount of feed of the second lens group L2, which changes in accordance with the zoom position of the imaging optical system, so as to maintain the focusing state even when the zoom position changes and makes corrections for performing a feed operation for the second lens group L2 by a fixed amount of rotational operation (below also called simply "feed correction"). This feed correction is realized by the lens barrel 1 of the present embodiment.

The lens barrel 1, to hold the first lens group L1 to fourth lens group L4 in a movable manner, as shown in FIG. 1 to FIG. 13, has a fixed barrel 50, zoom operation ring 51, zoom drive barrel 53, zoom guide barrel 52, cam barrel 24, focus lens frame 25, drive pin holding member 28, focus cam pins (drive cam pins) 101, first group barrel 38, etc.

The fixed barrel 50 is a barrel shaped member not moving with respect to a not shown camera body during a zoom operation and during a focus operation and has grooves parallel to the optical axis direction of the imaging optical system comprised of the fixed barrel advancing grooves 50a and fixed barrel cam grooves 50b. The fixed barrel 50 has a lens mount 40 fixed to it. The lens mount 40 is detachably attached to the not shown cam groove body.

Note that unless particularly alluded to otherwise, in the following explanation, movement in the direction parallel to the optical axis X of the imaging optical system based on the fixed barrel 50 will be called "advance". Further, "rotation" will indicate rotation about the optical axis X. Further, the direction parallel to the optical axis X of the imaging optical system and moving away from the lens mount 40 will be called the "front (object side)" and the one moving close to the lens mount 40 will be called the "rear (image plane side)".

The zoom operation ring 51 is a member rotating due to a rotational drive force by direct manual operation of the photographer at the time of a zoom operation. As shown in FIG. 3, the zoom operation ring 51 is formed at its inner circumference with grooves parallel to the optical axis direction comprised of a plurality of advancing grooves 51a at approximately equal intervals in the circumferential direction. The zoom operation ring 51 in the present embodiment turns in a range of an angle α from a wide angle end to a telescopic end (see FIG. 16A, 16B and FIG. 17A).

As shown in FIG. 4 to FIG. 8, the zoom drive barrel 53 rotates with respect to a zoom guide barrel 52 arranged at its inner circumference side, but does not move in the optical axis X direction. It is attached rotatably to the outer circumference of the zoom guide barrel 52 to advance together with it. The zoom drive barrel 53, as shown in FIG. 3, is formed with a plurality of drive force transmission pins 53b, engaging with the advancing grooves 51a formed at the inner circumference of the zoom operation ring 51, at approximately equal intervals in the circumferential direction at the outer circumference of the rear end side of the drive barrel 53.

These transmission pins 53b transmit the rotational drive force from the zoom operation ring 51 to the zoom drive barrel 53. In accordance with the zoom operation ring 51, the zoom drive barrel 53 rotates in the range of the angle α from the wide angle end to the telescopic end.

Figure 4:
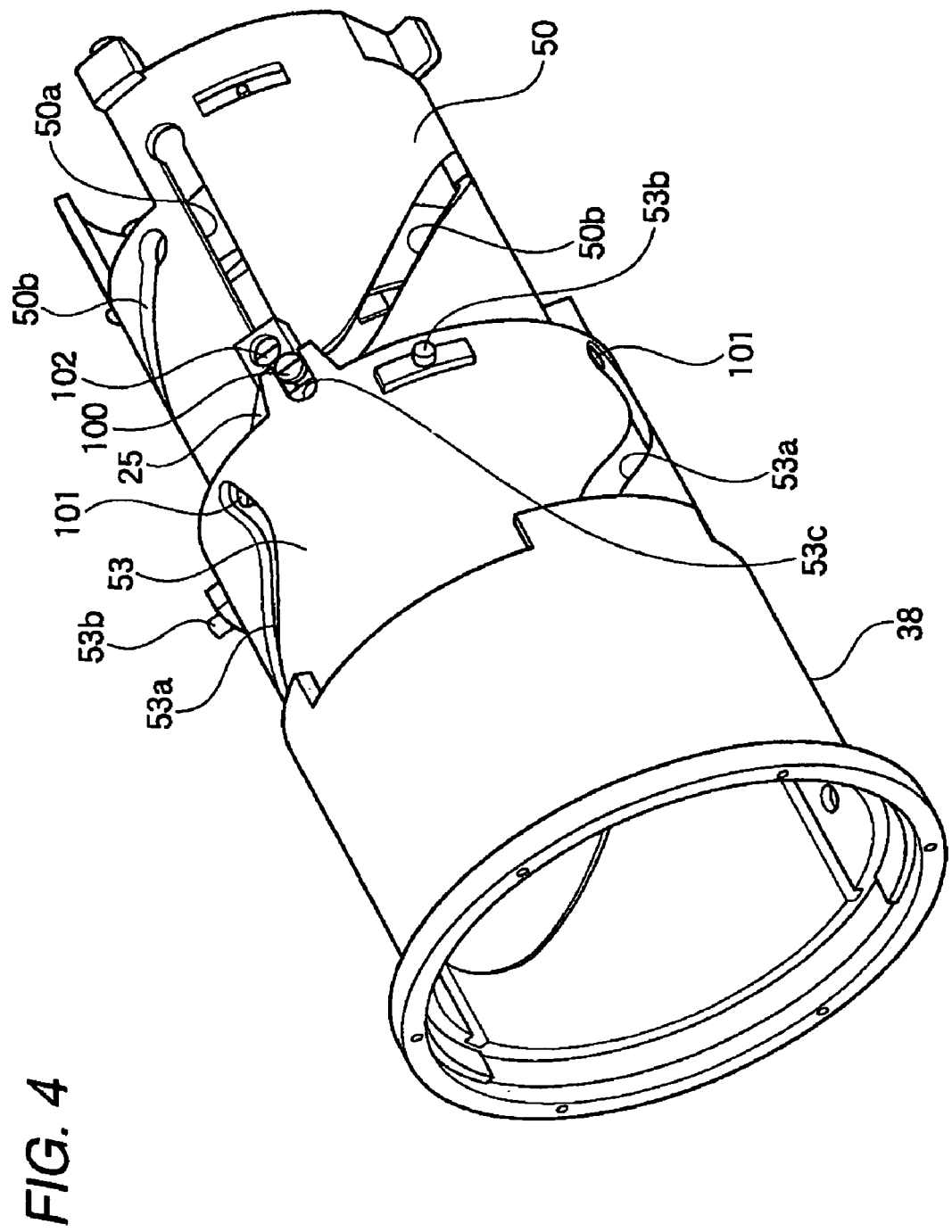
FIG. 4 is a perspective view showing a telescopic state in a fixed barrel, zoom drive barrel, and first group barrel in the lens barrel shown in FIG. 3.
Figure 5:
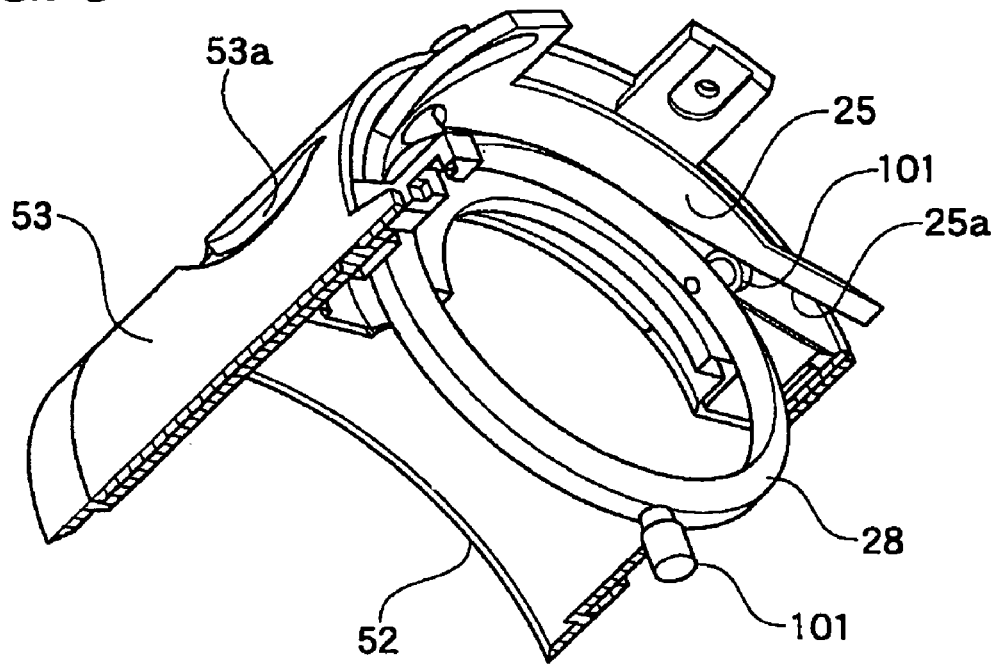
FIG. 5 is a disassembled perspective view of a zoom drive barrel, zoom guide barrel, and drive pin holding member shown in FIG. 4.
Figure 7:
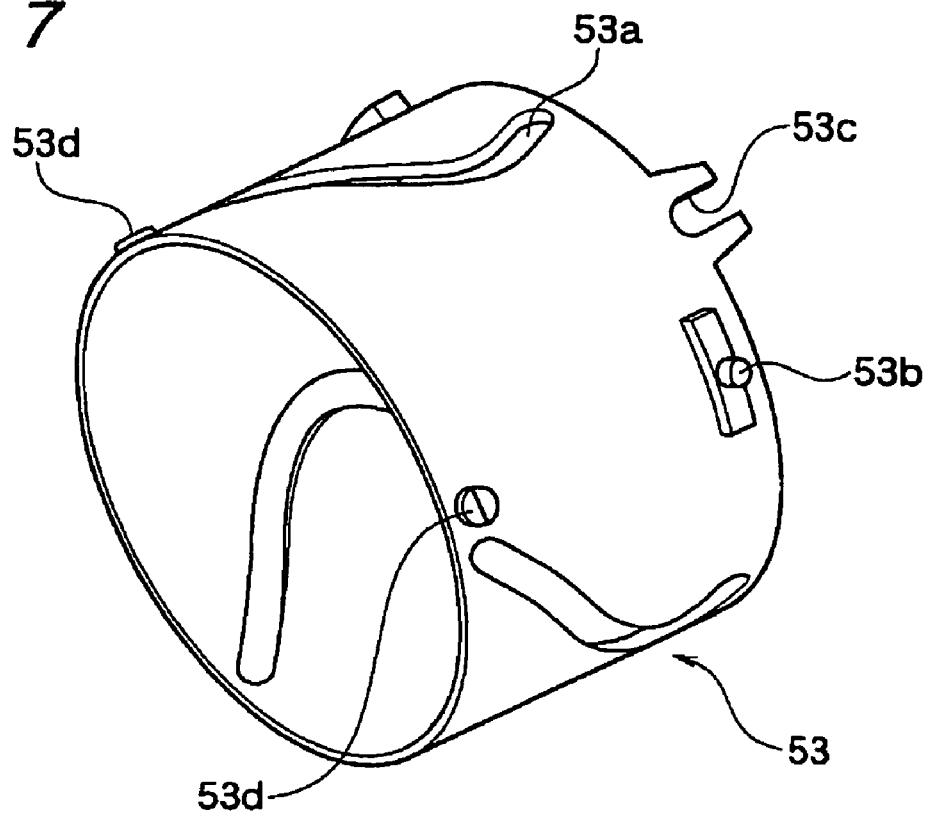
FIG. 7 is a perspective view of a zoom drive barrel shown in FIG. 6.
Figure 11:
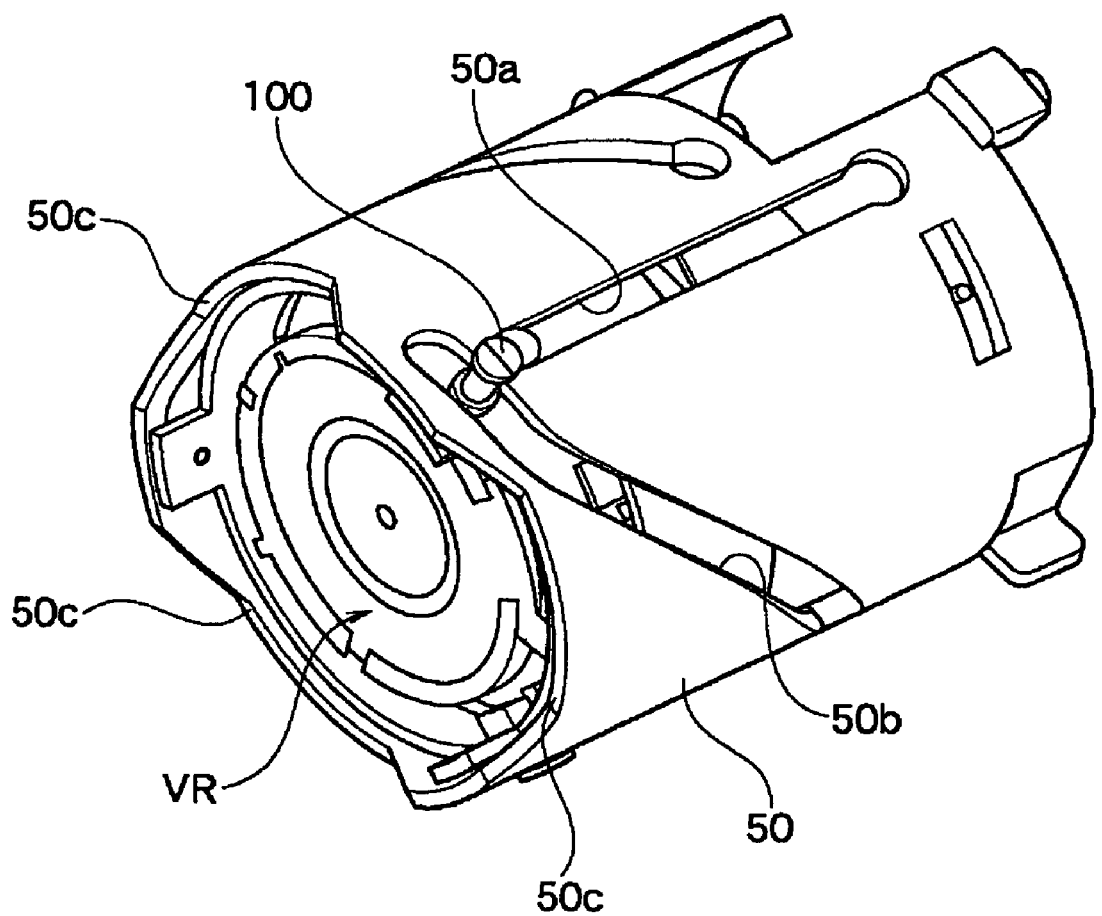
FIG. 11 is a perspective view of a fixed barrel shown in FIG. 1 to FIG. 3.
Figure 12:
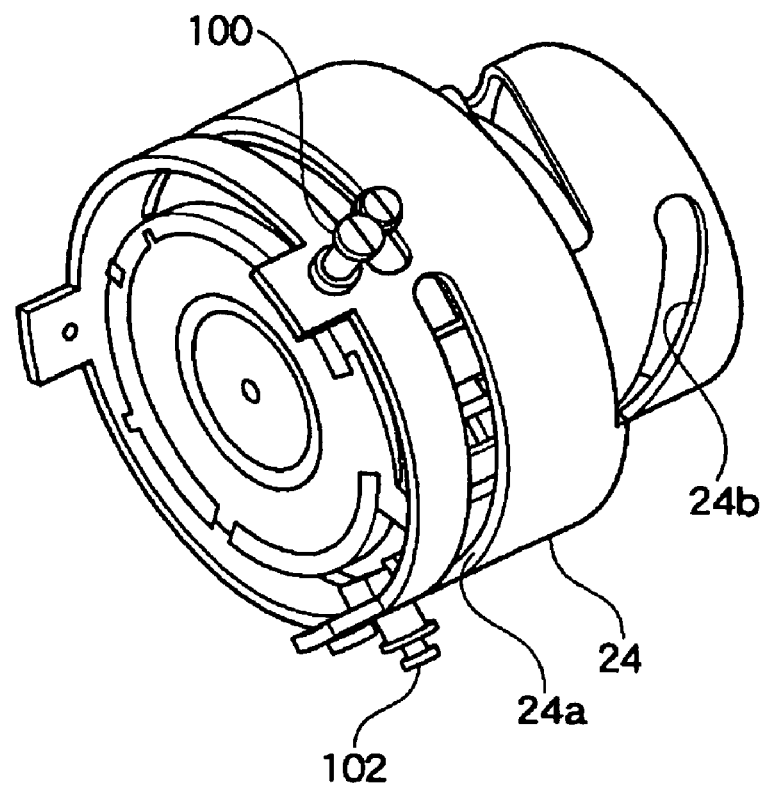
FIG. 12 is a perspective view of a cam barrel positioned inside the fixed barrel shown in FIG. 11 and its contents.

As shown in FIG. 1 and FIG. 4 and FIG. 7, the zoom drive barrel 53 has drive grooves 53c parallel to the optical axis at the outer circumference at the rear end side. The advancing grooves 53c engage with the cam barrel pins 100 shown in FIG. 1, FIG. 4, FIG. 11, and FIG. 12. The cam barrel pins 100, as shown in FIG. 12, are fastened to the cam barrel 24.

As shown in FIG. 4 and FIG. 7, the zoom drive-barrel 53 is formed with a plurality of (in the figure, three) correction cam grooves 53a at equal intervals in the circumferential direction. The correction cam grooves 53a are formed in the range of the angle δ shown in FIG. 17A.

Figure 10:
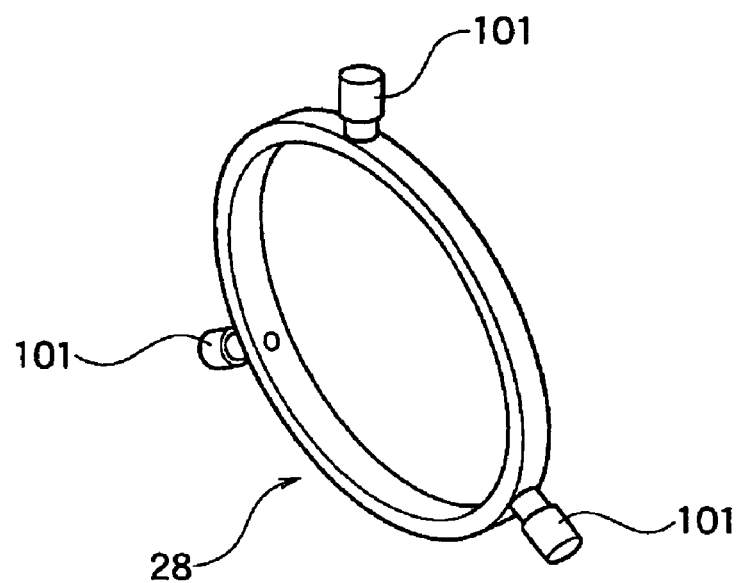
FIG. 10 is a perspective view of a drive pin holding member shown in FIG. 1 to FIG. 3.

Each correction cam groove 53a engages with one of the plurality of focus cam pins 101 (three in the illustration) formed at approximately equal intervals at outer circumferential positions of the drive pin holding member 28 shown in FIG. 10. Each correction cam groove 53a passes through the drive barrel 53 between the inner and outer circumferences.

Figure 6:
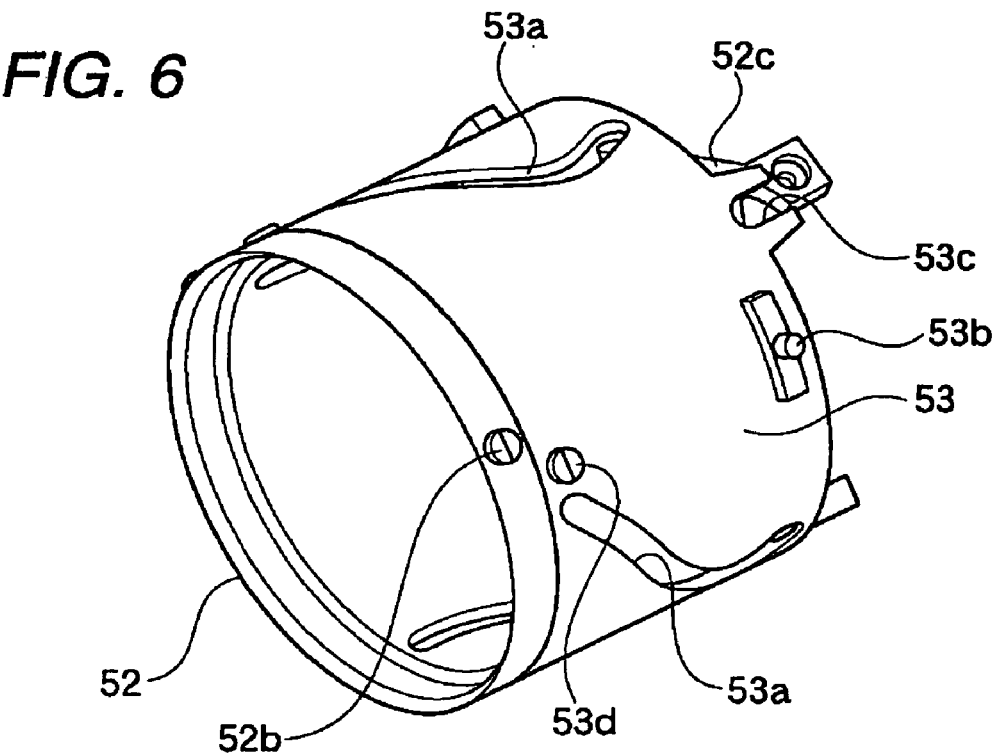
FIG. 6 is a perspective view of a zoom drive barrel and zoom guide barrel shown in FIG. 4.

As shown in FIG. 6 and FIG. 7, the zoom drive barrel 53 is formed with a plurality of front cam pins 53d at its outer circumference in the front in the optical axis direction. The cam pins 53d engage with the first group barrel cam grooves 38b formed at the inner circumference side of the first group barrel 38 shown in FIG. 3 so as not to pass through to the inner circumference side. The first group barrel cam grooves 38b are formed at a slant with respect to the optical axis X direction.

As shown in FIG. 3, the first group barrel 38 is formed at its inner circumference side with a plurality of first group barrel guide grooves 38a parallel to the optical axis X at approximately equal intervals in the circumferential direction. These guide grooves 38a do not pass through the first group barrel 38 from the inner circumference to the outer circumference like the cam grooves 38b. The guide grooves 38a engage with guide pins 52b shown in FIG. 3 and FIG. 8.

By the drive barrel 53 being rotated about the optical axis X with respect to the guide barrel 52, the cam pins 53d move in the cam grooves 38b and the not rotating guide pins 52b move in the guide grooves 38a. For this reason, the first group barrel 38 can advance or retract with respect to the drive barrel 53 and guide barrel 52. Note that the first group barrel 38 has the lens group L1 fixed to it.

Figure 8:
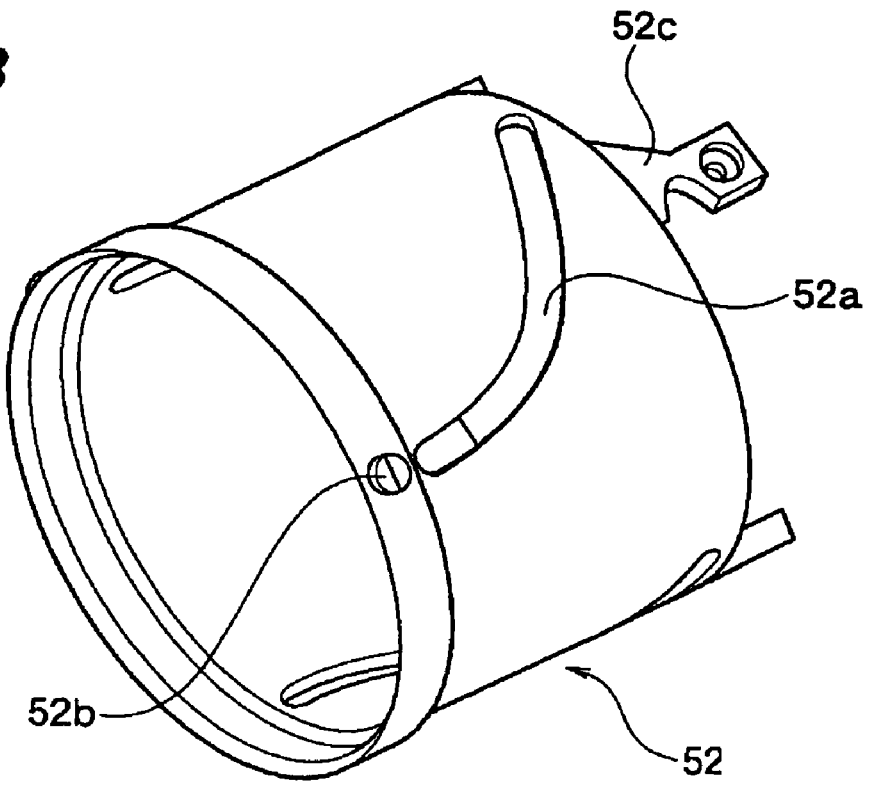
FIG. 8 is a perspective view of a zoom guide barrel shown in FIG. 6.

The zoom guide barrel 52, as shown in FIG. 8, is formed with a plurality of zoom cam grooves 52a at equal intervals in the circumferential direction so as to pass between the inner and outer circumferential surfaces. The zoom cam grooves 52a, as shown in FIG. 17A and FIG. 17B, are formed in a range of the angle γ. In the present embodiment, the sum of the angle γ of the cam grooves 52a and the angle δ of the cam grooves 53a is the range of rotation of the zoom operation ring 51 (drive barrel 53) and corresponds to the angle α from the wide angle end to the telescopic end. That is, the cam grooves 52a and the cam grooves 53a define the rotational angle of the drive barrel 53 about the X-axis.

Each cam groove 52a, together with each cam groove 53a, is engaged with a focus cam pin 101 shown in FIG. 10. At the rear end side of the guide barrel 52 in the optical axis X direction, as shown in FIG. 2 and FIG. 8, rear projections 52c are formed thickly at the inside diameter side of the guide barrel 52 from the barrel shaped part in the circumferential direction at a plurality of positions.

Each rear projection 52c, as shown in FIG. 2, has a zoom guide barrel pin 102 fastened to it through a boss 102a. The guide barrel pins 102, as shown in FIG. 4, engage with the fixed barrel advancing grooves 50a of the fixed barrel 50 positioned at the inner circumferential side of the guide barrel 52. Therefore, the guide barrel 52 to which the guide barrel pins 102 are fixed does not rotate with respect to the fixed barrel 50 and only advances along the advancing grooves 50a. The drive barrel 53 arranged at the outer circumference of the guide grooves 52 rotates about the optical axis X without moving relative to the guide barrel 52 in the optical axis X direction.

Figure 13:
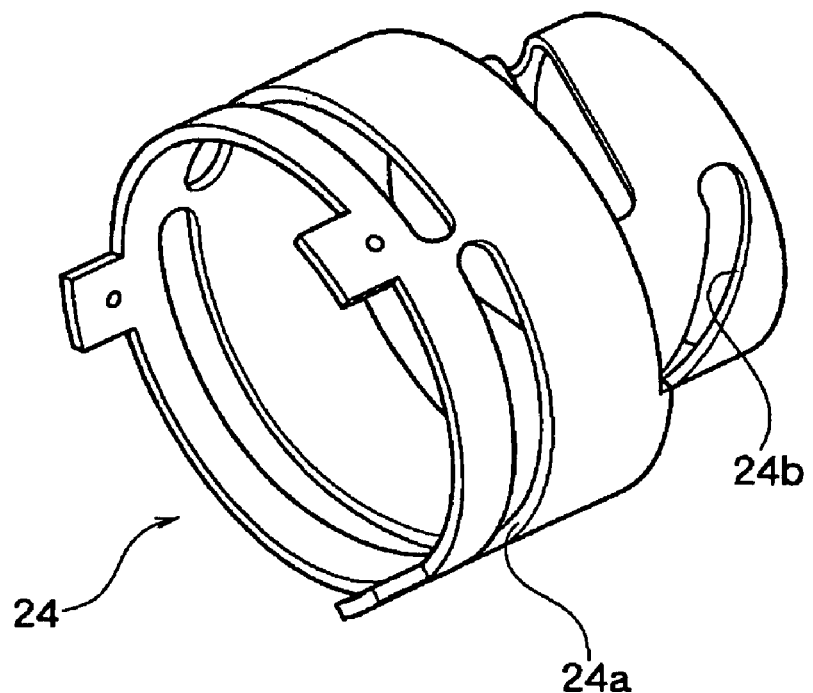
FIG. 13 is a perspective view of the cam barrel shown in FIG. 12 by itself.

By rotation of the drive barrel 53, the pins 100 engaged with the drive grooves 53c are made to move along the fixed barrel cam grooves 50b formed passing through the fixed barrel 50 and the cam barrel 24 to which the pins 100 are fixed is made to rotate about the optical axis X and is made to move in the optical axis X direction. The cam barrel 24, as shown in FIG. 12 and FIG. 13, is formed with third group lens cam grooves 24a and fourth group lens cam grooves 24b passing between the inner and outer circumferential surfaces.

The third group lens cam grooves 24a, as shown in FIG. 12, engage with zoom guide barrel pins 102. The pins 102 are fixed to a third lens holding barrel holding the third lens group L3 shown in FIG. 1 to FIG. 3. The third lens holding barrel holding the third lens group L3 is provided with a not shown advancing guide and prevented from rotating. For this reason, rotation of the drive barrel 53 causes the pins 100 to also rotate. Along with this, the cam barrel 24 is also made to rotate and move in the optical axis direction. At this time, the third lens holding barrel holding the third lens group L3 moves in the optical axis X direction without rotation due to the action of the cam grooves 24a.

The fourth group lens cam grooves 24b formed at the cam barrel 24 are engaged with fourth group drive pins fixed to the outer circumference of a fourth lens holding barrel holding the fourth lens group L4 arranged at the inner circumference of the rear end side of the cam barrel 24. Further, the fourth lens holding barrel holding the fourth lens group L4 is provided with a not shown advancing guide and is prevented from rotation. For this reason, in accordance with the rotation and advance of the cam barrel 24, due to the action of the cam grooves 24b, the fourth lens holding barrel holding the fourth lens group L4 moves in the optical axis X direction without rotation.

The fourth lens group L4 and the third lens group L3 are supported at the cam barrel 24 arranged at the inner circumferential side of the fixed barrel 50, so are structured to be resistant to deviation from the optical axis. Further, in the front of the third lens holding barrel holding the third lens group L3 and at the rear of the second lens group L2 (image plane side), a vibration reduction system VR shown in FIG. 11 is arranged. The vibration reduction system VR eliminates the effects of the vibration of the lens barrel 1 at the image plane side of the second lens group L2.

Figure 9:
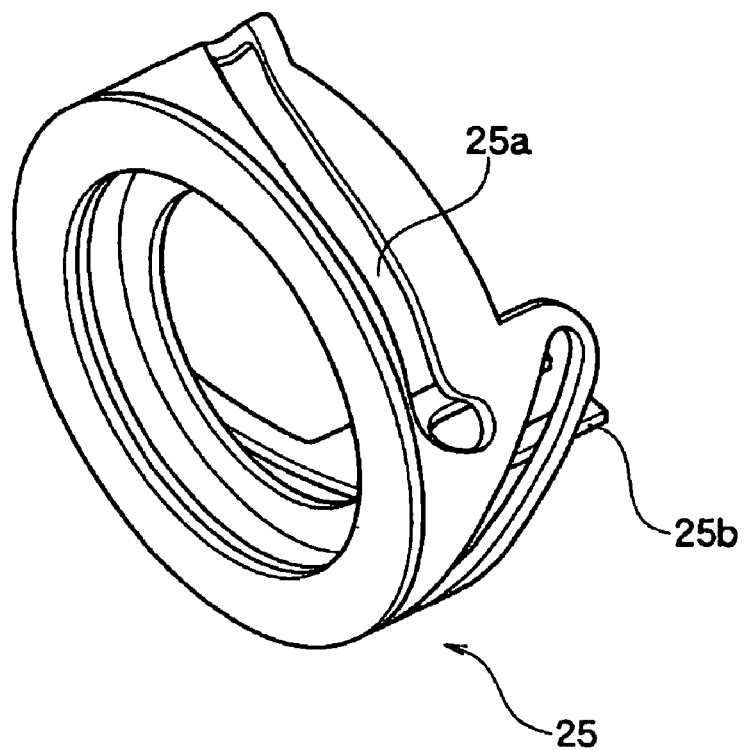
FIG. 9 is a perspective view of a focus lens frame shown in FIG. 1 to FIG. 3.

As shown in FIG. 1 to FIG. 3, the focus lens frame 25 shown in FIG. 9 is arranged at the outer circumferential side of the front of the fixed barrel 50 and the inner circumferential side of the guide barrel 52. The lens frame 25, as shown in FIG. 1 to FIG. 3, has the second lens group L2 fixed to it. The lens frame 25 is formed with focus cam grooves 25a at a plurality of positions at equal intervals in the circumferential direction. The cam grooves 25a pass through the lens frame 25 between the inner and outer circumferential surfaces.

At the rear end side of the lens frame 25 in the optical axis X direction, there is a drive force transmission part 25b (see FIG. 9) receiving rotational drive force (focus drive force) selectively from a not shown focus motor or focus operation ring 54. The drive force transmission part 25b has not a shown pin for transmitting the focus drive force engaged with it, but at the time of a zoom operation, this not shown pin is designed not to rotate by the drive resistance force imparted to the focus motor and focus operation ring 54. That is, at the time of zoom operation, the second lens group L2 held at the lens frame 25 moves in the optical axis X direction without rotating about the optical axis X.

The cam grooves 25a of the lens frame 25 have the focus cam pins 101 formed at the outer circumference of the drive pin holding member 28 arranged at the inner circumference side of the lens frame 25 engaged with them. The drive pin holding member 28 is not connected in any way with the fixed barrel 50 and is in a floating state at a position in front of the fixed barrel 50.

The drive pin holding member 28, as shown in FIG. 10, is preferably ring shaped, but may also be another shape. Note that as shown in FIG. 10, three focus cam pins 101 are integrally provided at the drive pin holding member 28, so inclination of the focus cam pins 101 and phase deviation between the focus cam pins 101 are prevented.

Further, the drive pin holding member 28 has an outside diameter smaller than the inside diameter of the fixed barrel 50, so in the wide angle end state where the total length of the lens barrel 1 becomes short (see FIG. 1), the focus pins 101 enter the notches 50c provided in the fixed barrel 50 (see FIG. 11) and the drive pin holding member 28 can be fit inside the fixed barrel 50, so the lens barrel can be made smaller.

The focus cam pins 101 fixed to the drive pin holding member 28, as shown in FIG. 3, pass through the cam grooves 25a of the lens frame 25 and engage with the cam grooves 52a of the guide barrel 52 positioned at the outer circumferential side and the cam grooves 53a of the drive barrel 53 positioned at the outer circumference of that. That is, the pins 101 simultaneously engage with the three cam grooves 25a, 52a, and 53a. Further, the holding member 28 formed with the pins 101 can rotate independently with respect to the fixed barrel 50, lens frame 25, guide barrel 52, and drive barrel 53 and can move in the optical axis X direction. Next, the operation of the lens barrel of the present embodiment will be explained.

Figure 14:
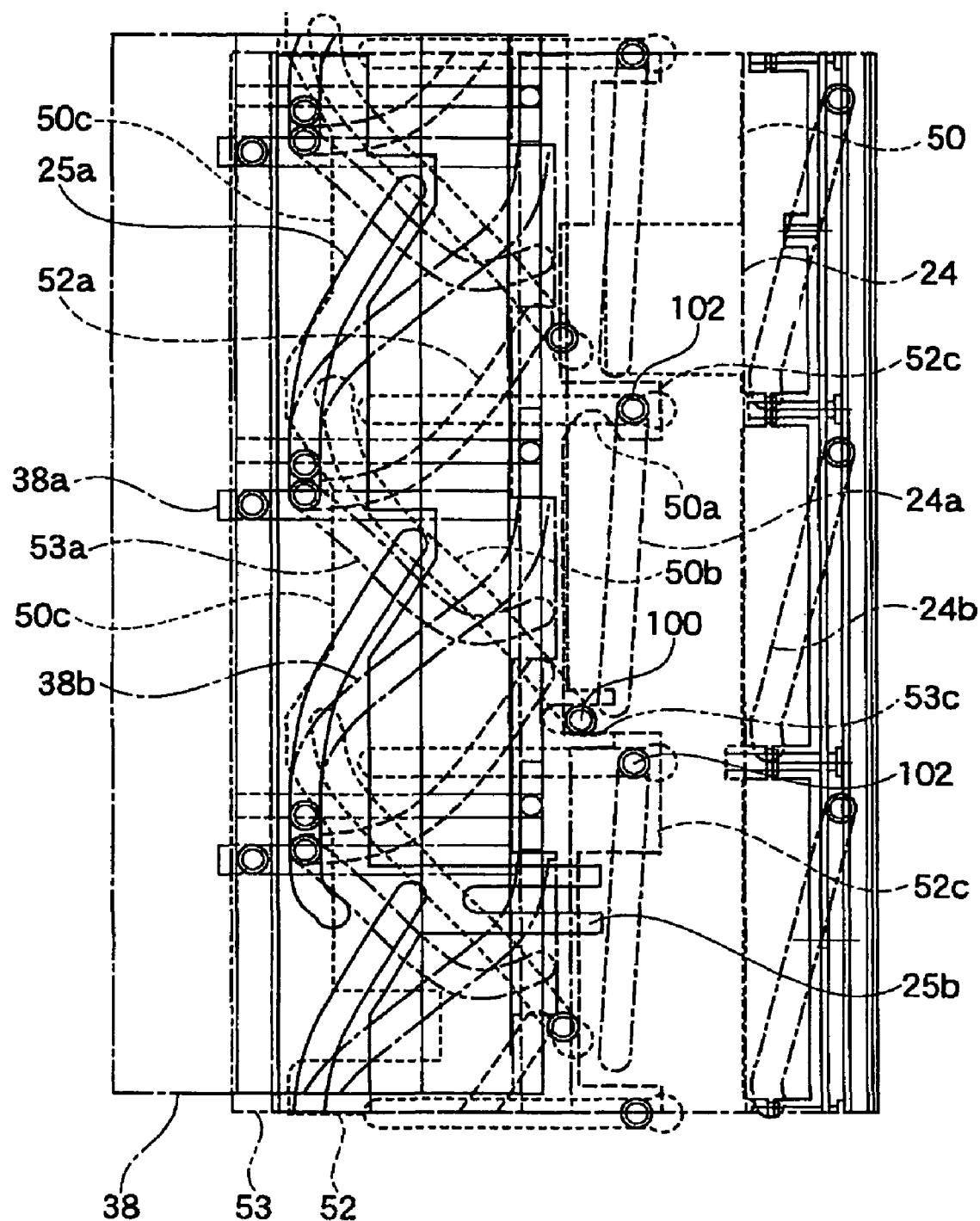
FIG. 14 is an unfolded view of a fixed barrel, zoom guide barrel, zoom drive barrel, cam groove barrel, focus lens frame, and first group barrel in the wide angle end state as seen from the outer circumference.
Figure 15:
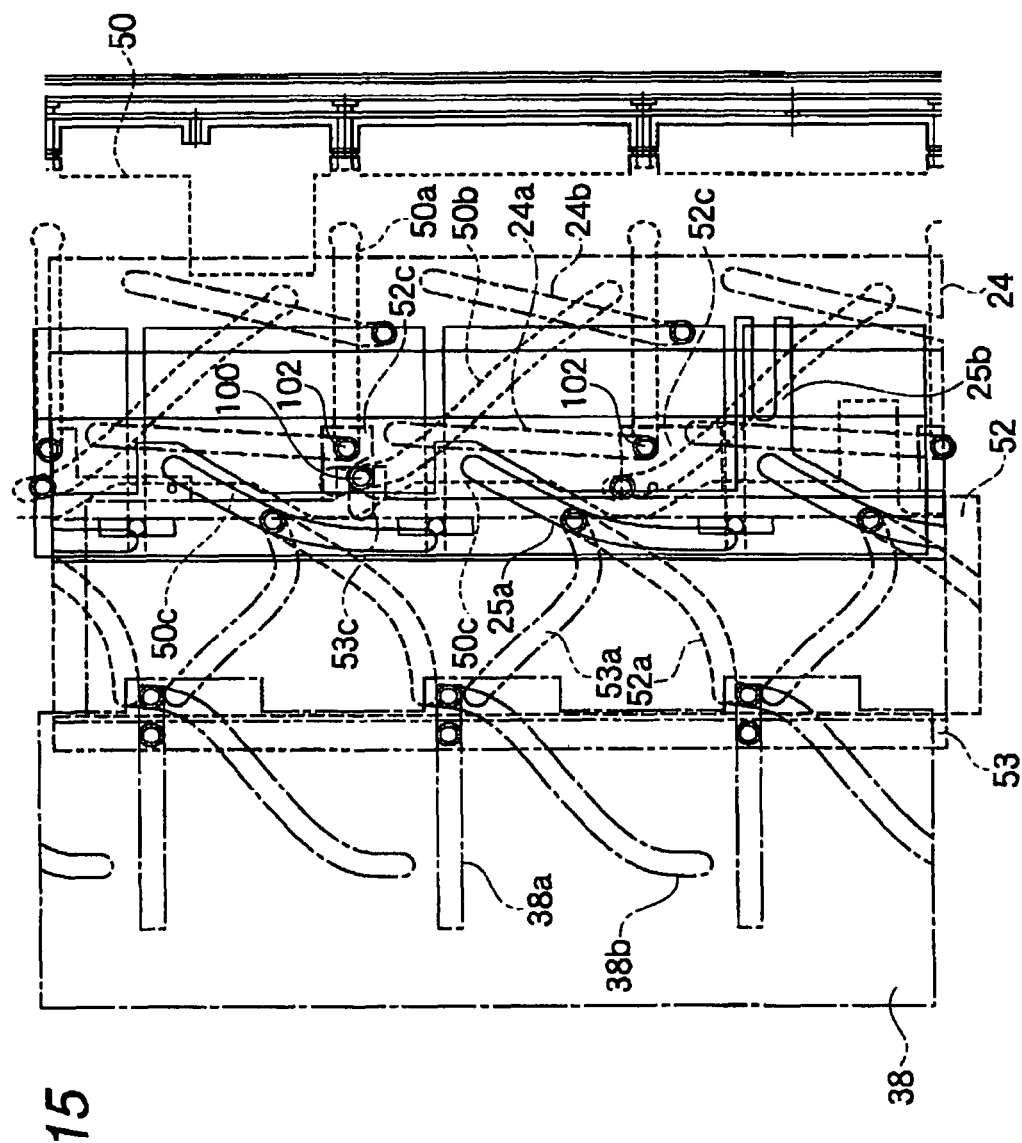
FIG. 15 is an unfolded view of a fixed barrel, zoom guide barrel, zoom drive barrel, cam groove barrel, focus lens frame, and first group barrel in the telescopic end state as seen from the outer circumference.

If operating the zoom operation ring 51 shown in FIG. 1 to FIG. 3 to drive the rotation of the drive barrel 53, the positional relationship between the pins 101 and the three cam grooves 25a, 52a, and 53a changes from the state of FIG. 14 to FIG. 15, the state of FIG. 16A to FIG. 16B, or the state of FIG. 17A to FIG. 17B, that is, the wide angle end state, to the telescopic end state. Opposite movement is also possible.

If using the zoom operation ring 51 shown in FIG. 1 to rotate the drive barrel 53 from the wide angle end to the telescopic end by the angle α, the cam barrel pins 100 engaged with the drive grooves 53c of the drive barrel 53 also are rotated by the angle α. The cam barrel pins 100 are provided at the cam barrel 24 and are engaged with the fixed barrel cam grooves 50b as well, so the cam barrel 24 advances while rotating by the angle α in accordance with the fixed barrel cam grooves 50b.

The third group lens cam grooves 24a provided at the cam barrel 24 are engaged with the zoom guide barrel pins 102, so the zoom guide barrel 52 and third lens group L3 advance by the amount of movement of the sum of the amount of movement in the advancing direction due to the cam grooves 24a and the amount of advancing movement of the cam barrel 24 itself. Further, the zoom guide barrel 52 advances, so the zoom drive barrel 53 attached to its outer circumference also advances while rotating together with the zoom guide barrel 52.

The fourth lens group L4 is restricted from rotation by the advancing guide pins from the third lens group L3, and the fourth group use drive pins engage with the fourth group lens cam grooves 24b provided at the cam barrel 24. Therefore, the fourth lens group L4 advances by the amount of movement of the sum of the amount of movement in the advancing direction due to the cam grooves 24b and the amount of advancing movement of the cam barrel 24 itself.

In the first group barrel 38, as explained above, the first group barrel guide grooves 38a are restricted from rotation by the guide pins 52b, and the cam pins 53d and the first group barrel cam grooves 38b are engaged. Therefore, as explained above, when the zoom guide barrel 52 advances and the zoom drive barrel 53 rotates while advancing, the first group barrel 38 advances by the amount of movement of the amount of advancing movement of the zoom guide barrel 52 and zoom drive barrel 53 and the amount of movement by the first group barrel cam grooves 38b together with the first lens group L1.

The focus cam pins 101 advance while the zoom guide barrel 52 advances and the zoom drive barrel 53 advances while rotating, so the position where the correction use cam grooves 53a and the zoom cam grooves 52a switch, in other words, the position determined by the combination of the correction cam grooves 53a and the zoom cam grooves 52a moves. That is, the zoom operation is performed and the amount of that zoom operation is determined by the combination or coordination of the correction cam grooves 53a and zoom cam grooves 52a.

The focus lens frame 25, as explained above, is restricted from rotation so as not to rotate at the time of zoom operation, so advances without rotation along with movement of the focus cam pins 101.

Here, the functions of the focus cam pins 101, focus cam grooves 25a, correction cam grooves 53a, and zoom cam grooves 52a will be explained based on FIG. 17A and FIG. 17B. FIG. 17A shows the wide angle end state, while FIG. 17B shows the telescopic end state.

The focus cam grooves 25a are cam grooves correcting the amount of feed of the second lens group L2 and cam grooves adjusting the focus at the zoom position. As shown in FIG. 17A and FIG. 17B, the range of relative movement of the focus cam pins 101 due to the focus operation (what actually rotates in the focus operation is the focus lens frame 25) is a range of an angle β. This angle β does not change at the zoom positions from the wide angle end to the telescopic end.

The focusing is performed by selectively transmitting a rotational drive force (focus drive force) from a not shown focus motor or focus operation ring 54 to a drive force transmission part 25b provided at a rear end side of the lens frame 25 in the optical axis X direction (see FIG. 9). As a result, the lens frame 25 rotates with respect to the cam pins 101 along the cam grooves 25a. For this reason, the lens frame 25 moves relative to the guide barrel 52 in the X-axial direction, the second lens group L2 is made to move relative to the first lens group L1 in the X-axial direction, and a focusing operation becomes possible.

However, the curves of the cam grooves with respect to the pins 101 at the cam grooves 25a in the range of the angle β at the different zoom position changes. For example, in FIG. 19, when the wide angle end zoom position is Z1 and the telescopic end zoom position is Z5, the intermediate positions are designated as Z2 to Z4.

Figure 20:
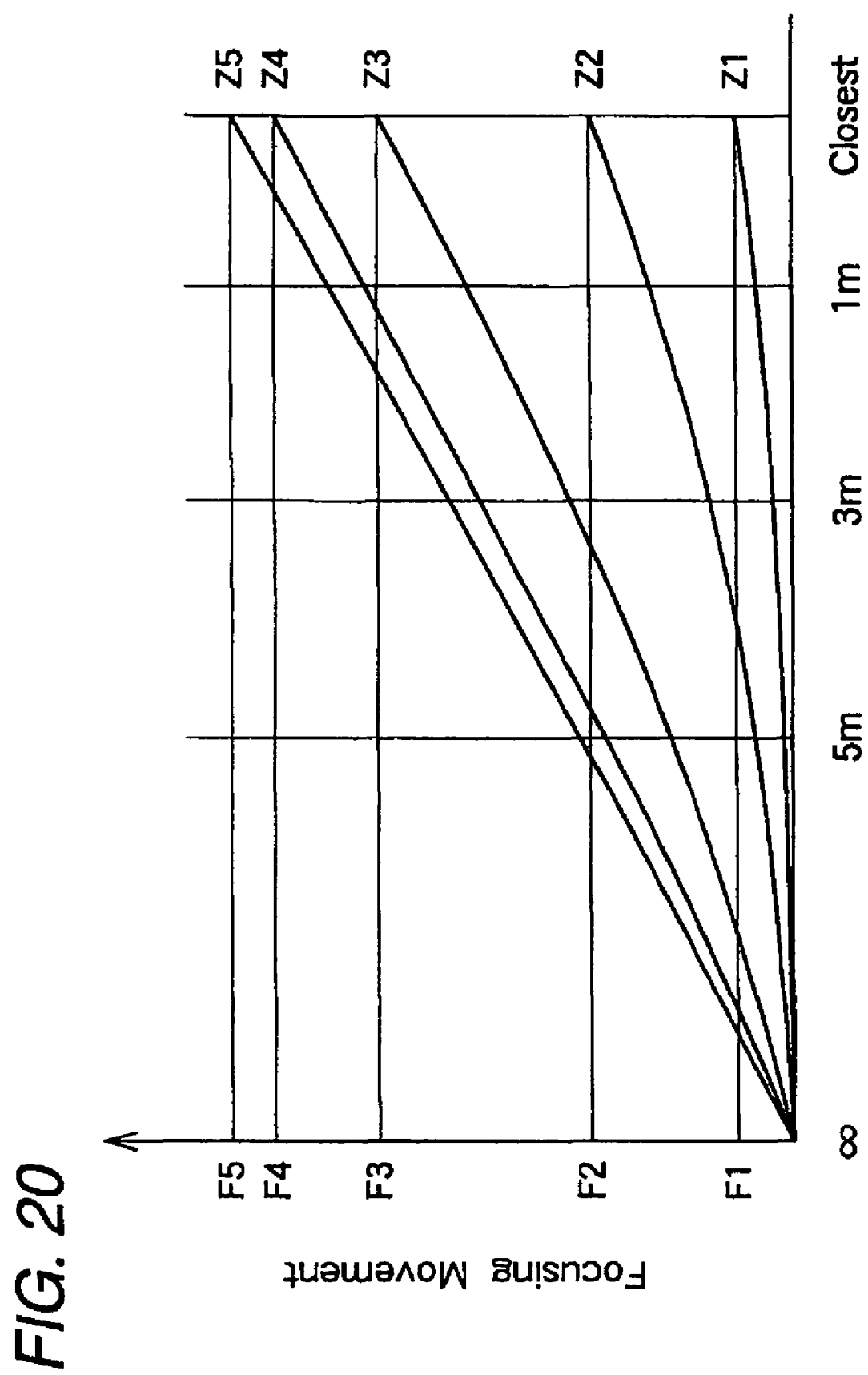
FIG. 20 is a graph showing the relationship between an amount of movement of a focus lens frame at different zoom positions and a rotational angle of a focus operation ring.
Figure 21:
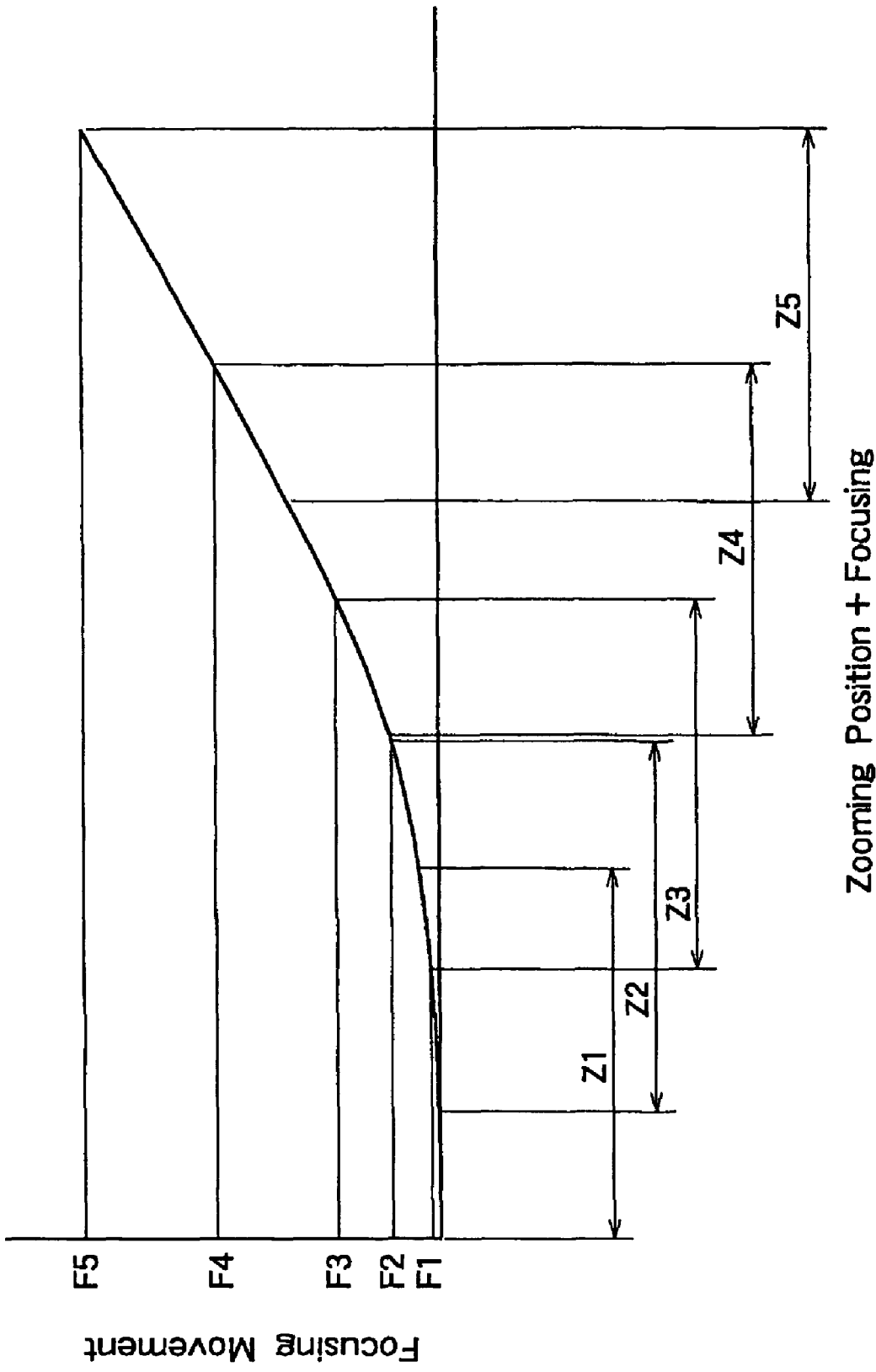
FIG. 21 is a graph showing the amount of movement of a focus lens frame at a zoom position as one curve with a shifted origin.

At the wide angle end zoom position Z1, to focus from infinity to the nearest distance, focusing becomes possible in the range of the focus adjustment angle β by moving the second lens group L2 by the amount of movement F1. Further, at the telescopic end zoom position Z5, to focus from infinity to the nearest distance, focusing becomes possible in the range of the focus adjustment angle β by moving the second lens group L2 by the amount of movement F5. Further, at the intermediate zoom positions Z2 to Z4, for focusing from infinity to the nearest distance, focusing becomes possible in the range of the focus adjustment angle β by moving the second lens group L2 by the amounts of movement F2 to F4. These relationships are graphed separately in FIG. 20 to FIG. 21.

For such a design, to design the focus cam grooves 25a, the shapes of the focus cam grooves 25a are designed as follows. That is, as shown in FIG. 17A, at the wide angle end side, the angles of inclination of the cam grooves 25a are designed small so that even if the cam pins 101 move relatively in the focus adjustment angle β, the amount of movement of the focus lens frame 25 (that is, second lens group L2) in the optical axial direction will become relatively small.

Further, as shown in FIG. 17B, at the telescopic end side, the angles of inclination of the cam grooves 25a are designed large so that even if the cam pins 101 move relatively in the focus adjustment angle β, the amount of movement of the focus lens frame 25 (that is, second lens group L2) in the optical axial direction will become relatively large.

As the zoom power becomes greater, in the past, the lengths of the cam grooves for moving the lens groups L1 to L4 became longer and the lengths of the focus cam grooves 25a in which the cam pins 101 were engaged also had to be designed longer. However there is a limit to the lengths of the focus cam grooves 25a able to be formed at the lens frame 25 holding the lens group L2. They cannot be made that long.

Therefore, in the present embodiment, as explained above, the cam pins 101 are made able to move in the axial direction and rotate independent from the lens frame 25, fixed barrel 40, drive barrel 53, and guide barrel 52 and further the cam pins 101 are made to simultaneously engage with the cam grooves 25a, 52a, and 53a. For this reason, the angle α of the zoom operation of the zoom operation ring shown in FIG. 1 to FIG. 3 is equal to the rotational angle of the drive barrel 53. Further, that zoom operation angle α becomes the total of the angle range γ of the cam grooves 52a and the angle range δ of the cam grooves 53a.

That is, the wide angle end position (Wide) at the time of a zoom operation is defined when the cam pins 101 are positioned at one end side of the cam grooves 52a, while the telescopic position (Tele) at the time of the zoom operation is defined when the cam pins 101 are positioned at the other end side of the cam grooves 52a. Further, similarly, the wide angle end position (Wide) at the time of a zoom operation is defined when the drive cam pins 101 are positioned at one end side of the cam grooves 53a, while the telescopic position (Tele) at the time of the zoom operation is defined when the cam pins 101 are positioned at the other end side of the cam grooves 53a.

Therefore, in the present embodiment, even if the zoom operation angle α corresponding to the angle of rotational movement of the drive barrel 53 is made relatively large, the movement of the cam pins 101 in the focus cam grooves 25a from the wide angle end to the telescopic end can be reduced and therefore the length of the focus cam grooves 25 in the longitudinal direction can be made shorter.

Note that as shown in FIG. 3, in a zoom operation, at least parts of the cam grooves 52a are positioned at the front (object side) from the second lens group L2. For this reason, the distance between the first lens group L1 and second lens group 2 can be made larger and the zoom power can be made larger.

That is, due to the zoom operation, the zoom drive barrel 53 rotates in the range of the zoom operation angle α, but the range of the angle by which the focus cam pins 101 move, determined by the combination of the cam grooves 53a and the cam grooves 52a, becomes smaller than the range of the zoom operation angle α, in the present embodiment, the same as the angle range γ of the cam grooves 52a.

Further, in the lens barrel 1 according to the present embodiment, the drive pin holding member 28 at which the cam pins 101 for simultaneously engaging with the cam grooves 25a, 52a, and 53a are formed is arranged in a floating state with respect to the fixed barrel 50, focus lens frame 25, zoom guide barrel 52, and drive barrel 53. That is, the drive pin holding member 28 is arranged independently so as to be able to rotate about the optical axis X and move in the optical axis X direction with respect to the fixed barrel 50, focus lens frame 25, zoom guide barrel 52, and drive barrel 53. For this reason, even if a zoom operation causes the lens frame 25, zoom guide barrel 52, and drive barrel 53 to move greatly with respect to the fixed barrel 50 in the optical axis X direction, the drive pin holding member 28 also can move while rotating in the optical axis direction tracking this.

As a result, even if giving priority to the design of the shape of the focus cam grooves 25a mainly used for adjusting the focus at the different zoom positions, the groove shapes of the zoom cam grooves 52a and correction grooves 53a used mainly for the high power zoom operation no longer become too sharp. For this reason, even a high power zoom lens barrel 1 can perform a smooth zoom operation and focus operation and the barrels 25, 52, and 53 where the cam grooves 25a, 52a, and 53a are formed can be made compact in configuration. As a result, the lens barrel 1 as a whole can be made compact.

Further, in the present embodiment, even if arranging a vibration reduction system VR at the image plane side of the second lens group L2, there is no need to make the cam groove mechanism for realizing a high power large at the outside. In this respect as well, the lens barrel 1 as a whole can be made compact. Further, since the cam groove mechanism is not complicated, this also contributes to a reduction in the number of parts.

In particular, in the present embodiment, by making the cam grooves 53a non-straight nonlinear shapes and providing bent parts in the middle of the grooves 53a in the longitudinal direction, it is possible to finely control the movement of the relative position of the cam pins 101 in the cam grooves 25a while rotating the drive barrel 53 from the wide angle end to the telescopic end. Further, by making the shapes nonlinear, the ratio of change of the focal distance of the lens groups L1 to L2 with respect to the rotational angle of the operation ring 51 for controlling the zoom power can be finely adjusted at the wide angle mode and at the telescopic mode, so the use becomes easier.

Further, in the present embodiment, the zoom operation angle α can be made relatively large, so the curve of the focus cam grooves 25 can be made much gentler and the drive force required for the focus operation can be reduced.

To change the zoom power from the wide angle end (Wide) to the telescopic end (Tele) or vice versa while maintaining the focus, in the optical design, it is necessary to make the lens groups L1 to L4 shown in FIG. 1 to FIG. 3 move by the paths of movement shown in for example FIG. 18A. Further, in the optical design, as shown by the curve C2 shown in FIG. 22, if changing the zoom operation angle from 0 to the maximum angle α=80 degrees, it is changed to give the focal distance of the illustrated abscissa at the different positions of the zoom operation angle (ordinate).

However, in such optical design, in practice, design of the cam grooves 52a, 53a, 25a shown in FIG. 17A and FIG. 17B is sometimes difficult. Further, in the paths of movement of the lens groups L2, L3 shown in FIG. 18A, the distance between these lens groups L2, L3 is narrow, so that the vibration reduction system VR shown in for example FIG. 11 is difficult to be placed between these lens groups L2, L3. Further, as shown by the curve C1 of FIG. 22, at the wide angle end side, it is desired to make the change of the focal distance smaller with respect to a change in the rotational angle of the zoom operation angle, while at the telescopic side, it is desired to make the change of the focal distance larger with respect to a change in the rotational angle of the zoom operation angle, that is, there are demands for improving the user friendliness in this and other ways.

In the present embodiment, by realizing the groove shapes of the cam grooves 25a, 52a, 53a shown in FIG. 17A and FIG. 17B, the paths of movement of the lens groups L1 to L4 are made the paths of movement as shown in FIG. 18A with respect to a change in rotational angle of the zoom operation angle. As a result, a change in the focal distance is realized with respect to a change in the rotational angle of the zoom operation angle shown by the curve C1 of FIG. 22.

That is, in the present embodiment, priority is given to the determination of the shapes of the focus cam grooves 25a, so even if making the correction cam grooves 53a linear cam groove shapes, the amounts of movement of the first lens group L1, third lens group L3, and fourth lens group L4 become larger at the telescopic side than the wide angle side. As a result, the fixed barrel cam grooves 50b end up much larger in gradient near the telescopic side.

Therefore, in the present embodiment, the correction cam grooves 53a are made nonlinear cam groove shapes and the amounts of movement of the first lens group L1, third lens group L3, and fourth lens group L4 with respect to the rotational angle of the zoom operation of the zoom operation ring 51 are prevented from changing much due to the zoom position. That is, the amount of rotation in the range of use near the telescopic end of the fixed barrel cam grooves 50b is made to appear larger than the range of use near the wide angle end. For this reason, the gradients of the fixed barrel cam grooves 50b are prevented from partially greatly increasing and a smooth drive operation is possible at any zoom position.

Note that even if giving priority to the determination of the shapes of the fixed barrel cam grooves 50b, if ending up making the correction cam grooves 53a linear cam groove shapes, the gradients of the focus cam grooves 25a will partially increase by an extreme amount and the focus precision will end up being detrimentally affected. Therefore, the correction cam grooves 53a are preferably made nonlinear cam groove shapes. Further, the zoom cam grooves 52a also preferably are made nonlinear.

Further, in the present embodiment, as shown in FIG. 12 and FIG. 13, by making the third group cam grooves 24a of the cam barrel 24 not grooves parallel to the rotational direction, but cam groove shapes driving the zoom guide barrel pins 102 in the optical axis direction, the amount of movement for making the zoom guide barrel 52 and third lens group L3 advance is shared with the third group cam grooves 24a. Due to this, the amount of movement for making the cam barrel 24 advance handled by the fixed barrel cam grooves 50b can be reduced and the gradients of the fixed barrel cam grooves 50b can be made gentler.

According to the present embodiment, even a lens barrel driving a high power imaging optical system for a zoom operation can smoothly operate for a zoom operation and focus operation.

Further, the outside diameter of the drive pin holding member 28 is smaller than the inside diameter of the fixed barrel 50, so the lens barrel can be made smaller.

Further, the first lens group L1 and the second lens group L2 are supported by the zoom guide barrel 52 fit in the fixed barrel 50 so are structured to be resistant to deviation from the optical axis, while the third lens group L3 and the fourth lens group L4 are supported by the cam barrel 24 fit in the fixed barrel 50, so are structured to be resistant to deviation from the optical axis. For this reason, while a high power zoom lens barrel in which the first lens group L1 to fourth lens group L4, that is, four lens groups, move, there is resistance to deviation from the optical axis in all of the lens groups and good optical performance can be maintained from the wide angle to telescopic end.

(Modifications)

The invention is not limited to the embodiments explained above. Various changes and modifications are possible. These are also in the scope of the present invention.

For example, in the embodiments, the example was shown of using the correction cam grooves 53a and the zoom cam grooves 52a for both the operations of correcting the amount of feed and converting the rotational angle, but the invention is not limited to these. For example, the interaction of these grooves 53a, 52a may also be used just for conversion of the rotational angle.

Further, the embodiments were explained with reference to exchangeable lenses, but the invention is not limited to this. For example, they may also be applied to a cameras with a built-in lens where the lens cannot be detached from the imaging device or other imaging part.

The invention claimed is:

1. A lens barrel, comprising:
   a first moving barrel having a first cam that is operable to perform a focusing operation and holds an optical system used for the focusing operation,
   a second moving barrel having a second cam and provided in relation to the first moving barrel,
   a third moving barrel having a third cam operable to perform a zooming operation,
   a driving cam pin engaged with the first cam, the second cam and the third cam, and
   a holding member holding the driving cam pin to rotate around an optical axis and move along the optical axis with respect to the first moving barrel, the second moving barrel and the third moving barrel,
   wherein the third moving barrel is able to rotate at a first angle ($\alpha$) corresponding to a rotation of a zoom operation ring,
   the first angle ($\alpha$) corresponds to a sum of a second angle ($\gamma$), in which the driving cam pin rotates along with the second cam, and a third angle ($\delta$), in which the driving cam pin rotates along with the third cam,
   at a time of performing the zooming operation, the driving cam pin moves in a distance determined by a combination of the second cam and the third cam, and the optical system is moved along the optical axis in accordance with a movement of the driving cam pin, and
   at a time of performing the focusing operation, the optical system is moved along with the optical axis by rotating the first moving barrel with respect to the driving cam pin.

2. The lens barrel according to claim 1,
   wherein a distance separating the first moving barrel and the third moving barrel in a radial direction with respect to an axial direction of the lens barrel is shorter than a length of the driving cam pin.

3. The lens barrel according to claim 1,
   wherein the second moving barrel is provided between the first moving barrel and the third moving barrel.

4. The lens barrel according to claim 1, wherein the first cam, the second cam and the third cam each comprise a cam groove.

5. The lens barrel according to claim 1, further comprising:
   a vibration reduction system that eliminates effects of a vibration of the lens barrel, the vibration reduction system being positioned toward an image plane side of the optical system.

6. The lens barrel according to claim 1,
   wherein a combination of the second cam and the third cam is operable to perform the zoom operation.

7. The lens barrel according to claim 1,
   wherein at least a part of the second cam is positioned toward an object side of the optical system at a time of a zoom operation.

8. The lens barrel according to claim 1,
   wherein the second moving barrel holds the first moving barrel, enabling a movement of the first moving barrel corresponding to the zooming operation.

9. The lens barrel according to claim 1,
   wherein the first moving barrel rotates relative to the driving cam pin, along the first cam, so as to move relative to the second moving barrel during a time of performing the focusing operation.

10. The lens barrel according to claim 1,
    wherein the driving cam pin is provided on the holding member and extends radially outwardly with respect to the optical axis.

11. A method of operation of a lens barrel, comprising:
    engaging a driving cam pin with a first cam that is disposed on a first moving barrel, the first moving barrel holding an optical system that is used for a focusing operation, so as to move the optical system,
    engaging the driving cam pin with a second cam that is disposed on a second moving barrel, the second moving barrel provided in relation to the first moving barrel,
    engaging the driving cam pin with a third cam that is disposed on a third moving barrel,
    moving the driving cam pin a distance determined by a combination of the second cam and the third cam,
    moving the optical system along the optical axis in accordance with a movement of the driving cam pin, so as to determine a position of the optical system at a time of performing a zoom operation, and
    moving the optical system along with the optical axis by rotating the first moving barrel with respect to the driving cam pin at the time of performing the focusing operation.

12. The method of operation of a lens barrel according to claim 11, further comprising:
    eliminating an effect of vibration of the lens barrel toward an image plane side of the optical system.

13. The method of operation of a lens barrel according to claim 11, further comprising:
    using the second cam and the third cam in combination for performing the zoom operation.

14. The method of operation of a lens barrel according to claim 11, further comprising:
    positioning at least a part of the second cam, at the time of performing the zoom operation, toward an object side of the optical system.

15. A lens barrel, comprising:
    a first moving barrel having a first cam that is operable to perform a focusing operation and holds an optical system used for the focusing operation,
    a second moving barrel having a second cam and provided in relation to the first moving barrel,
    a third moving barrel having a third cam operable to perform a zooming operation,
    a driving cam pin engaged with the first cam, the second cam and the third cam, and
    a holding member holding the driving cam pin to rotate around an optical axis and move along the optical axis with respect to the first moving barrel, the second moving barrel and the third moving barrel, wherein the third moving barrel is able to rotate at a first angle (α) corresponding to a rotation of a zoom operation ring, and
the first angle (α) corresponds to a sum of a second angle (γ), in which the driving cam pin rotates along with the second cam, and a third angle (δ), in which the driving cam pin rotates along with the third cam.

16. The lens barrel according to claim 15, wherein the second moving barrel is provided between the first moving barrel and the third moving barrel.

17. The lens barrel according to claim 15, further comprising:
a vibration reduction system that eliminates effects of a vibration of the lens barrel, the vibration reduction system being positioned toward an image plane side of the optical system.

18. A lens barrel, comprising:
a first moving barrel having a first cam and holding an optical system used for the focusing operation,
a second moving barrel having a second cam and provided in relation to the first moving barrel,
a third moving barrel having a third cam, and
a driving cam pin engaged with the first cam, the second cam and the third cam,
wherein the driving cam pin moves a distance determined by a combination of the second cam and the third cam, so that the optical system is moved along an optical axis in accordance with a movement of the driving cam pin, at a time of performing a zooming operation, and
the optical system is moved along with the optical axis by rotating the first moving barrel with respect to the driving cam pin at a time of performing a focusing operation.

19. The lens barrel according to claim 18,
wherein the second moving barrel is provided between the first moving barrel and the third moving barrel.

20. The lens barrel according to claim 18, further comprising:
a vibration reduction system that eliminates effects of a vibration of the lens barrel, the vibration reduction system being positioned toward an image plane side of the optical system.

21. The lens barrel according to claim 18, further comprising:
a fixed barrel,
wherein the first moving barrel moves along the optical axis without rotation with respect to the fixed barrel at the time of performing the zooming operation.

* * * * *